United States Patent
Higuchi

(10) Patent No.: US 9,098,733 B2
(45) Date of Patent: Aug. 4, 2015

(54) SKIN PATTERN IMAGE COLLECTION DEVICE, COLLECTION METHOD AND SKIN PATTERN MATCHING SYSTEM

(75) Inventor: Teruyuki Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 13/574,421

(22) PCT Filed: Jan. 14, 2011

(86) PCT No.: PCT/JP2011/051028
§ 371 (c)(1),
(2), (4) Date: Jul. 20, 2012

(87) PCT Pub. No.: WO2011/090143
PCT Pub. Date: Jul. 28, 2011

(65) Prior Publication Data
US 2012/0287254 A1 Nov. 15, 2012

(30) Foreign Application Priority Data
Jan. 20, 2010 (JP) ................................. 2010-009747

(51) Int. Cl.
*G06K 9/00* (2006.01)
(52) U.S. Cl.
CPC ................... *G06K 9/00046* (2013.01)
(58) Field of Classification Search
CPC .................................................. A61B 12/006
USPC ............. 348/77, 135; 382/124, 126, 127, 312
See application file for complete search history.

(56) References Cited

U.S. PATENT DOCUMENTS

| | | | | |
|---|---|---|---|---|
| 3,975,711 A * | 8/1976 | McMahon | | 382/126 |
| 5,650,842 A * | 7/1997 | Maase et al. | | 356/71 |
| 6,292,576 B1 * | 9/2001 | Brownlee | | 382/124 |
| 6,891,962 B1 * | 5/2005 | Kuno et al. | | 382/127 |
| 7,627,151 B2 * | 12/2009 | Rowe | | 382/124 |
| 7,747,046 B2 * | 6/2010 | McClurg | | 382/124 |

(Continued)

FOREIGN PATENT DOCUMENTS

| | | | |
|---|---|---|---|
| JP | 07-200771 A | | 8/1995 |
| JP | 2568310 B2 | | 1/1997 |

(Continued)

OTHER PUBLICATIONS

International Search Report of PCT/JP2011/051028 dated Feb. 15, 2011.

*Primary Examiner* — Paulos M Natnael
(74) *Attorney, Agent, or Firm* — Sughrue Mion, PLLC

(57) ABSTRACT

Provided is a skin pattern image collection device wherein it is possible to obtain a fingerprint image which has a high contrast and few distortions. The skin pattern image collection device is provided with a contact means in which two transparent sheets, which are formed with a plurality of grooves of the same shape arranged in a single direction on one surface, are overlapped, and an imaging means which is disposed so as to receive the light from the surface, on which the grooves are formed, of the contact means, wherein the contact means refracts the light, which is outputted from the transparent sheet that is farther from the imaging means of the two transparent sheets disposed on the contact means, in a roughly normal direction by means of the transparent sheet that is closer to the imaging means, thereby collecting the pattern of skin which is in contact with the transparent sheet that is farther from the imaging means.

19 Claims, 23 Drawing Sheets

(56) References Cited

U.S. PATENT DOCUMENTS

| | | | |
|---|---|---|---|
| 7,953,259 B2* | 5/2011 | McClurg | 382/124 |
| 8,768,015 B2* | 7/2014 | Higuchi | 382/125 |
| 2006/0291704 A1* | 12/2006 | McClurg | 382/127 |
| 2007/0279617 A1* | 12/2007 | Sherman | 356/71 |
| 2010/0013786 A1* | 1/2010 | Nishikawa et al. | 345/173 |
| 2010/0322537 A1* | 12/2010 | McClurg | 382/312 |

FOREIGN PATENT DOCUMENTS

| | | |
|---|---|---|
| JP | 2000-090248 A | 3/2000 |
| JP | 2004-173827 A | 6/2004 |
| WO | 2008/078895 A1 | 7/2008 |

* cited by examiner

SKIN PATTERN IMAGE COLLECTION DEVICE, COLLECTION METHOD AND SKIN PATTERN MATCHING SYSTEM

CROSS REFERENCE TO RELATED APPLICATIONS

This application is a National Stage of International Application No. PCT/JP2011/051028 filed Jan. 14, 2011, claiming priority based on Japanese Patent Application No. 2010-009747 filed Jan. 20, 2010, the contents of all of which are incorporated herein by reference in their entirety.

TECHNICAL FIELD

The present invention relates to a skin pattern image collection device and collection method which collect a pattern of a skin surface having unevenness as an image, and a skin pattern matching system which performs matching of collected skin patterns, and, more particularly, to a skin pattern image collection device and collection method which collect a stripe-shaped pattern of a skin surface such as a fingerprint and a palmprint as an image, and a skin pattern matching system which performs matching of collected stripe-shaped skin patterns.

BACKGROUND ART

As an apparatus which collects a pattern of unevenness of a skin surface optically, there is one which uses a triangular prism. Unevenness of a skin surface includes a fingerprint and a palmprint, for example. Hereinafter, a fingerprint image collection device using a prism will be described.

FIG. 22 is a diagram showing a structure of a fingerprint image collection device using a prism. On one face of a prism 2 (it is supposed that it is an upper surface), light is thrown from a light source 3 via another face at an angle equal to or more than the critical angle in the air. When an image sensor 4 is placed in a direction in which the thrown light is totally reflected by the upper surface, the image sensor 4 receives the light totally reflected by the upper surface via the further different surface of the prism 2. When making a finger 1 touch the upper surface of the prism 2, a surface of the skin of the finger does not touch the prism 2 in a valley part of a fingerprint. Therefore, light thrown on a valley part of a fingerprint is totally reflected by the upper surface of the prism 2. On the other hand, in a ridge part of the fingerprint, a surface of the skin of the finger touches the prism 2. Therefore, light thrown on a ridge part of the fingerprint is diffused at the contact zone without being reflected. Accordingly, when making a finger touch on the upper surface of the prism 2, a fingerprint image, in which a valley part of a fingerprint, at which light is totally reflected, is bright, and a ridge part, at which light is diffused, is dark, can be obtained at the image sensor 4.

Also, in patent literature 1, there is described an example of a body feature input apparatus that uses a film into which a plurality of V-shaped grooves which are identical in shape are formed, that is, a prism sheet instead of the above-mentioned prism is disclosed. Body features in the patent literature 1 includes a fingerprint, a palmprint, hand geometry, a footprint and the like.

FIG. 23 is a diagram illustrating a structure of a body feature input device of that document.

This body feature input device is a device made by changing the prism 2 of the above-mentioned fingerprint image collection device shown in FIG. 22 with a prism sheet 5. V-shaped grooves are formed at angle equal to or more than the critical angle in the air relative to the flat face of a prism sheet 5 (it is supposed that it is an upper surface). Light from the light source 3 is thrown via a face on which the grooves are formed. When the image sensor 4 is placed in a direction in which the thrown light is totally reflected by the upper surface, the image sensor 4 receives the light totally reflected by the upper surface. When making a finger 1 touch the upper surface of the prism sheet 5, a surface of the skin of the finger does not touch the prism sheet 5 in a valley part of a fingerprint. Therefore, light thrown on a valley part of the fingerprint is totally reflected by the upper surface of the prism sheet 5. On the other hand, a surface of skin of a finger touches the prism sheet 5 in a ridge part of a fingerprint. Therefore, light thrown on a ridge part of the fingerprint is diffused at the contact zone without being reflected. Accordingly, when making a finger touch the upper surface of the prism sheet 5, a fingerprint image, in which a valley part of a fingerprint, at which light is totally reflected, is bright, and a ridge part, at which light is diffused, is dark, can be obtained at the image sensor 4.

Meanwhile, in patent literature 1, there is a suggestion that a fingerprint image collection device is configured such that it obtains a fingerprint image by diffused light of a contact surface between a film and a finger, not by reflected light. In case a fingerprint image is obtained by diffused light, by photographing a part where a finger touches a film by the sensor 4, a pattern caused by a difference between intensity of the diffused light of a contact surface between the film and the finger and intensity of diffused light of skin of the finger in an area where the skin does not touch the film, which penetrates through the film, is obtained as a fingerprint image. (A convex portion of skin of a finger which touches a film and a portion corresponding to such convex portion in a fingerprint image are called a ridge line. Also, a concave portion of skin of a finger which does not touch a film and a portion corresponding to such concave portion in a fingerprint image are called a valley line.) In this case, a position of the sensor 4 is not limited to a position at which illumination light totally reflected by the upper surface of a prism sheet can be observed.

CITATION LIST

Patent Literature

[Patent Literature 1] Japanese Patent Publication No. 2568310

BRIEF SUMMARY OF THE INVENTION

Problem to be Solved by the Invention

Because a fingerprint image collection device using a prism utilizes a thick triangular prism, there is a problem that the size of the device becomes large.

On the other hand, in a body feature input device described in patent literature 1, the problem that the size of a device becomes large due to use of a thick triangular prism is settled. However, as in the case of the above-mentioned fingerprint image collection device, there is a problem that angles at which a fingerprint image can be photographed by reflected light are limited to angles which are equal to or larger than the critical angle at which the light thrown on the sensor face is totally reflected.

Further, because an angle between a direction in which light totally reflected by a sensor face can be observed and the normal direction of the sensor face is an angle equal to or larger than the critical angle and thus it becomes large, an angle between a direction of an optical axis of an image sensor and the normal direction of the sensor face has to be set large similarly. Because an image sensor photographs a fingerprint which emerges on the sensor face as contrast of reflected light and diffused light at an angle equal to or larger than the critical angle, an obtained fingerprint image will be one greatly transformed compared with one photographed from the normal direction of the sensor face. Accordingly, when a fingerprint of a photographed fingerprint image is tried to be corrected so that it may be shaped like a fingerprint seen from the normal direction of the sensor face, there is a problem that an error is large because distortion of a fingerprint is large.

Also, a method to collect a fingerprint image by diffused light using a fingerprint image collection device described in patent literature 1 is conceivable. In this case, by setting a position to install the sensor 4 to a position where photographing can be performed directly in front of the film, or, by setting it to the same position where a fingerprint image is collected by reflected light, a fingerprint image can be obtained. However, when seen in front of the film (approximately in the normal direction of the surface of the film), there is only a small difference between the intensity of the diffused light of a contact surface between a finger and the film and the intensity of diffused light, which penetrates through the film, of skin of the finger at a valley line which does not touch the film. Therefore, in case a fingerprint image collection device of patent literature 1 photographs in front of the film (approximately the normal direction of the surface of the film), there is a problem that a good fingerprint image cannot be taken because contrast is not good and thus ridge lines are not clear.

Meanwhile, when photographing is performed from an angle exceeding a critical angle of transmitted light of a film, light diffused in a valley line, which does not touch the film, of skin of a finger, which penetrates through the film, is not observed because the critical angle is exceeded. On the other hand, sweat and sebum generally exist in a part where skin of a finger touches a film. Refractive indexes of skin of a finger, sweat, and sebum are closer to the refractive index of a film than the refractive index of air. Therefore, unless the critical angle in a contact portion is exceeded, diffused light of a ridge portion that touches the sensor face is observed even in a position beyond the critical angle in a valley line. Accordingly, from angles which exceed the critical angle in a valley line but do not exceed the critical angle of a ridge line portion that touches the sensor face, a fingerprint having a clear ridge line can be obtained.

However, because photographing is performed from a direction which forms a large angle with the normal line of a film, there is a problem that a obtained fingerprint image is distorted greatly compared with an image photographed roughly from the normal direction of the film. Also, in this case, when an obtained fingerprint image is tried to be corrected to a shape of the fingerprint image seen from the normal direction of the sensor face, there is a problem that an error is caused because the distortion is large.

Further, because the sensor face of the aforementioned fingerprint image collection device is of a planar shape and is firm, and, on the other hand, a finger is soft and has a three-dimensional shape, even if a finger is pressed onto the sensor face at the time of fingerprint image collection, portions that can touch the sensor face are limited to part of the surface of the finger. Therefore, there is a problem that only a fingerprint in a small range that can be made to touch the sensor face can be collected. Further, when an area to be touched by a finger is tried to be made large, the finger needs to be pressed hard, and thus there is a problem that distortion of a fingerprint becomes large.

Accordingly, there have been cases in which a fingerprint image in a wide range is collected by rotating a finger while pushing it against a sensor surface, photographing a plurality of fingerprint images and synthesizing them. However, because strength to push a finger against a sensor surface differs according to a portion of the finger as the finger is rotated while being pushed against the sensor face, the way in which the finger is distorted when it is pushed against the sensor surface is also different according to a part of the finger. Therefore, there is a problem that when synthesizing a plurality of fingerprint images into one fingerprint image, the image are not connected well.

An object of the present invention is to provide a skin pattern image collection device which can obtain a fingerprint image with small distortion and high contrast.

Means to Solve the Problem

A skin pattern image collection device of the present invention comprises: a contact means in which two transparent sheets, each of which has an approximately flat surface and is formed with a plurality of grooves of the same shape arranged in a single direction on another surface, are overlapped so that the approximately flat surface of one of the transparent sheets and the surface on which the grooves are formed of the other transparent sheet face each other; and an imaging means which is disposed so as to receive light from the surface, on which the grooves are formed, of the contact means, wherein the contact means refracts light, which is outputted from the transparent sheet that is farther from the imaging means of the two transparent sheets of the contact means, in a roughly normal direction by means of the transparent sheet that is closer to the imaging means, and the imaging device collects a pattern of unevenness of skin which is in contact with the transparent sheet that is farther from the imaging means by photographing the light.

An skin pattern matching system of the present invention comprises: a skin pattern image collection device including a contact means in which two transparent sheets, each of which has an approximately flat surface and is formed with a plurality of grooves of the same shape arranged in a single direction on another surface, are overlapped so that the approximately flat surface of one of the transparent sheets and the surface on which the grooves are formed of the other transparent sheet face each other; and an imaging means which is disposed so as to receive light from the surface, on which the grooves are formed, of the contact means, wherein the contact means refracts light, which is outputted from the transparent sheet that is farther from the imaging means of the two transparent sheets of the contact means, in a roughly normal direction by means of the transparent sheet that is closer to the imaging means, and the imaging device collects a pattern of unevenness of skin which is in contact with the transparent sheet that is farther from the imaging means by photographing the light; and a skin pattern matching device including: a control means for controlling the skin pattern image collection device, and reading a skin pattern image collected by the skin pattern image collection device from the skin pattern image collection device; an image correction means for correcting the skin pattern image read by the control means; a feature extraction means for extracting a feature for matching from the skin pattern image and generating feature data; and a matching means for performing matching of skin patterns based on feature data generated by the feature extraction means.

A skin pattern collection method of the present invention comprises: overlapping two transparent sheets, each of which has an approximately flat surface and is formed with a plurality of grooves of the same shape arranged in a single direction on another surface, so that the approximately flat surface of one of the transparent sheets and the surface on which the grooves are formed of the other transparent sheet face each other; refracting light, which is outputted from the transparent sheet that is farther from a view point of the two transparent sheets of the contact means, in a roughly normal direction by means of the transparent sheet that is closer to the imaging means, and collecting a pattern of unevenness of skin which is in contact with the transparent sheet that is farther from the viewpoint by the refracted light.

A matching method of the present invention comprises: overlapping two transparent sheets, each of which has an approximately flat surface and is formed with a plurality of grooves of the same shape arranged in a single direction on another surface, so that the approximately flat surface of one of the transparent sheets and the surface on which the grooves are formed of the other transparent sheet face each other; refracting light, which is outputted from the transparent sheet that is farther from a view point of the two transparent sheets of the contact means, in a roughly normal direction by means of the transparent sheet that is closer to the imaging means, and collecting a pattern of unevenness of skin which is in contact with the transparent sheet that is farther from the viewpoint by the refracted light, reading a skin pattern image by a skin pattern collection device, correcting a skin pattern image which is collected, extracting a feature for matching from the skin pattern image and generating feature data; and performing matching of skin patterns based on the generated feature data.

Effects of the Invention

In the present invention, there is an effect that a fingerprint image having small distortion and high contrast can be obtained.

EXEMPLARY EMBODIMENT TO CARRY OUT THE INVENTION

[First Exemplary Embodiment]

Next, exemplary embodiments of the present invention will be described in detail with reference to drawings.

FIG. 1 is a front view showing a structure of a skin pattern image collection device corresponding to a first exemplary embodiment of the present invention.

Referring to FIG. 1, a skin pattern image collection device 100 according to this exemplary embodiment includes a pair of sheets which are a sheet 11 and a sheet 12, which is a contact unit to contact skin of a finger and the like, and an imaging unit 20.

The sheet 11 and the sheet 12 are transparent sheets each having one face that is approximately flat, and the other face on which a large number of identically-shaped linear grooves are formed approximately in parallel. As such sheet, there is a prism sheet in which a large number of V-shaped grooves are formed onto the face of one side approximately in parallel, for example. A prism sheet includes ones having a concentrating property which inputs incident light having a spread of angles of a certain range and emits light having a spread of angles of a smaller range. Such prism sheet is used in a liquid crystal display apparatus, for example, for a backlight in order to improve luminance seen from the front of the liquid crystal. Such prism sheet is also used in order to improve the light condensing efficiency on a light reception surface of a photovoltaic cell.

An example in which a prism sheet is used in order to improve the light condensing efficiency of a photovoltaic cell is disclosed in patent literature 2. In addition, an example of a prism sheet used for a backlight is disclosed in patent literature 3.

[Patent literature 2] Japanese Patent Application Laid-Open No. 2007-73774
[Patent literature 3] Japanese Patent Application Laid-Open No. 2009-266792

FIG. 2 is a perspective view illustrating an example of a prism sheet used in the first exemplary embodiment of the present invention. In FIG. 2, indication is made such that the face on which grooves of a prism sheet are formed turns upward.

Such prism sheet shown in FIG. 2 has an effect that makes light which enters the face with no grooves of a prism sheet from a direction where an angle to the normal of the prism sheet is large and penetrates through the prism sheet be refracted such that it will have an angle of emergence nearer to the angle of the normal direction, that is, the thickness wise direction of the prism sheet. In order for a prism sheet to have such effect, it should be made of a material which has a refractive index higher than air and enables light to penetrate through it. Hereinafter, the face of a sheet, on which such grooves are formed, will be called a prism plane, and the face, on which such grooves are not formed, will be called a flat plane. In the following description, it is supposed that the normal of a sheet indicates the normal of the flat plane of the sheet.

Hereinafter, an example in which such transparent sheets which are the sheet 11 and the sheet 12 are a prism sheet will be described. However, when it is a sheet that has an effect to make a ray of light which enters a sheet from a direction of a large incident angle and penetrates through the sheet be refracted to an angle nearer to the normal direction of the sheet and then emitted, the shape of grooves formed onto the sheet does not matter. Even when a sheet is a prism sheet, when it is a prism sheet that has an effect to make a ray of light which enters a sheet from a direction of a large incident angle and penetrates through the sheet be refracted to an angle nearer to the normal direction of the sheet and then emitted, the shape of V-shaped grooves formed onto the sheet does not matter.

As shown in FIG. 1, an imaging unit 20 is installed in one side of the sheet 11 and the sheet 12, which are overlapped such that they are adjacent to each other, in a manner facing the sheet 11 and the sheet 12. The sheet 11 and the sheet 12 are overlapped so that the prism planes of both sheets may be directed to the imaging unit 20 side together. The sheet 11 and the sheet 12 may or may not be in contact with each other, or may be in contact with each other partially. In the drawing of FIG. 1 or later, in order to make it easily understood that sheets are two-ply, two sheets are described in a form that they are separated a little.

The imaging unit 20 is, for example, a sensor such as a CCD sensor and CMOS sensor which can obtain an image, or a camera equipped with such sensor. The imaging unit 20 photographs the sheet 11 and the sheet 12 overlapped from the prism plane side of both sheets. A position at which the imaging unit 20 performs photographing is also called a view point position.

Although detailed description will be made later, when a skin pattern image is obtained by reflected light, lighting equipment which is not illustrated is provided in a position in the prism plane side of the sheet 12 where light totally reflected by the flat plane of the sheet 11 enters the imaging unit 20. When a skin pattern image is obtained by diffused light, lighting equipment which is not illustrated may be installed in one of positions in the flat plane side of the sheet 11, or special lighting equipment does not have to be installed. In a case in which a skin pattern image is obtained by diffused light and lighting equipment is installed, light from the lighting equipment penetrates a finger, a palm or the like and is diffused at a surface of the skin. When no special lighting equipment is installed, ambient light penetrates a finger, a palm or the like and is diffused at a surface of the skin. When a fingerprint image is obtained by diffused light, diffused light at a surface of skin in the side of touching the sheet enters the imaging unit 20.

Next, an operation of the skin pattern image collection device 100 of this exemplary embodiment will be described in detail with reference to a drawing. Hereinafter, description will be made supposing that a part of a body from which a skin pattern image is collected is a finger. However, the part of a body from which a skin pattern image is collected is not limited to a finger, if the part has unevenness in a skin surface, from which a pattern can be collected, like a palm and a sole of the foot. When the part of a body from which a skin pattern image is collected is a finger, the skin pattern image is a fingerprint image.

FIG. 3 is a diagram illustrating a state when collecting a skin pattern image according to this exemplary embodiment. Skin of the finger 1, from which a pattern is collected, is in contact with the flat plane of the sheet 11. The imaging unit 20 photographs light emitted from the sheet 12 as an image, and outputs it as a skin pattern image.

At the time of skin pattern image collection, when a part having unevenness on a skin surface of a finger, a palm or the like touches a flat plane of the sheet 11 and the sheet 12 overlapped, a convex portion of the skin touches the flat plane. On the other hand, because a concave portion of skin does not touch the flat plane, an area of the flat plane between areas with which convex portions have contact, which corresponds to the concave portion, exposes to air.

The imaging unit 20 photographs a difference in brightness of a convex portion, where skin touches the flat plane, and a concave portion, where the flat plane is exposed to air, as a pattern of the skin.

As mentioned above, in patent literature 1, there is disclosed a body feature input apparatus using only one prism sheet for a part which a finger is made to touch. When a fingerprint image is obtained by reflected light by a body feature input apparatus described in patent literature 1, a structure in which light from a light source installed in the prism plane side of the prism sheet is totally reflected by a flat plane part of the prism sheet which exposes to air, and enters a photographing device is adopted. When a fingerprint image is photographed with the arrangement of this case, a difference between intensity of light made by light from a light source being totally reflected by an area of the flat plane, which skin does not touch, and intensity of diffused light made by the light from the light source being diffused by a convex portion of the skin in an area of the flat plane, which a convex portion of the skin touches, will be a pattern of a fingerprint. Therefore, a fingerprint image of clear contrast is obtained.

On the other hand, when a fingerprint image is obtained by diffused light, a fingerprint image is photographed by adopting an arrangement in which a light source, a prism sheet and a photographing device are arranged such that light which is caused by light from a light source and is totally reflected by the prism sheet does not reach the photographing device. In this case, a difference between intensity of diffused light of a convex portion of skin and intensity of light caused by the diffused light of a concave portion of skin penetrating through the prism sheet appears as a fingerprint image. When a fingerprint image is obtained by diffused light by a body feature input apparatus described in patent literature 1, an image sensor should perform photographing from an angle enabling to receive at least either diffused light of a convex portion of skin or diffused light of a concave portion of skin.

When seen from a direction where an angle to the normal of a prism sheet is smaller than the critical angle, the distortion of a skin pattern image is small. However, because a difference between intensity of diffused light of a convex portion of skin and intensity of light made by diffused light of a concave portion of skin penetrating through the prism sheet is small, contrast of an obtained skin pattern image will be small.

On the other hand, when seen from an angle equal to or more than the critical angle where light enters from the prism plane of the prism sheet is totally reflected by the flat plane of the prism sheet, because the critical angle is exceeded, light made by diffused light from a concave portion of skin penetrating through the prism sheet does not arrive. Therefore, unless there is reflected light, light from an area of a flat plane, which corresponds to a concave portion of skin, does not arrive.

Meanwhile, an area of a prism sheet, with which a convex portion of a finger comes in contact, is touched by a skin surface, or sweat and sebum of the skin surface adheres to it. Because a refractive index of skin, sweat, and sebum is larger than air, the critical angle of an area corresponding to a convex portion of skin will be larger than the critical angle in an area corresponding to a concave portion of skin. (Meanwhile, when the refractive index of a prism sheet is smaller than the refractive indexes of skin, sweat, and sebum, a critical angle does not exist.)

Accordingly, even when seeing from an angle equal to or more than the critical angle in an arwa corresponding to a concave portion of skin, unless the angle does not exceed the critical angle of an area which a convex portion of skin touches, diffused light of a convex portion of skin arrives. Therefore, when photographing from an angle equal to or more than the above-mentioned critical angle in an area corresponding to a concave portion of skin, a skin pattern image of high contrast is obtained.

In the case of one prism sheet as is the case with the body feature input device described in the above-mentioned patent literature 1, when photographing from an angle equal to or more than the critical angle of a area of the prism sheet, which skin does not touch, a skin pattern image of high contrast is obtained by both of reflected light and transmitted light.

The skin pattern image collection device 100 of this exemplary embodiment corresponds to one in which, on the prism sheet of the body feature input device of cited literature 1, another prism sheet is stacked. As mentioned above, a prism sheet has an effect to bring a direction of a ray of light whose angle to the normal of the prism sheet is large nearer to the direction of the normal by refraction. In FIG. 24 and FIG. 25, a schematic diagram of an optical path of light which comes nearer to the direction of the aforementioned normal by refraction is shown.

FIG. 24 is a diagram illustrating an example of an optical path of light which is totally reflected by a valley line area in this exemplary embodiment.

As shown in FIG. 24, light, which enters a valley line area, where the flat plane of the sheet 11 exposes to air, at an angle equal to or more than the critical angle, is totally reflected by the flat plane of the sheet 11. By the sheet 12, the totally reflected light is refracted in an angle near the normal direction of the sheet 11 and the sheet 12.

Accordingly, a fingerprint image of high contrast by reflected light can be obtained by photographing the sheet 11 touched by a finger and the sheet 12 from a roughly normal direction of the sheet 11 and the sheet 12 along which totally reflected light of the sheet 11 arrives.

In this exemplary embodiment, FIG. 25 is a diagram illustrating an example of an optical path of diffused light at a ridge line area.

As shown in FIG. 25, at a ridge line area in which a surface of skin touches the flat plane of the sheet 11, light which enters from the prism plane of the sheet 11 and is diffused within the skin of a finger or diffused light which falls on an upper part of the finger and then penetrates within the finger is radiated. As is the case with the above-mentioned prism sheet, at an area where the finger touches the sheet 11, the sheet 11 is touched by a skin surface or sweat and sebum adheres to it. Because a refractive index of skin, sweat and sebum are larger than that of air, the critical angle of a ridge line area is larger than the critical angle in a valley line area. However, when the refractive index of the sheet 11 is smaller than the refractive index of skin, sweat and sebum, the critical angle does not exist. Anyway, there exists light which is diffused light of a ridge line area and is emitted from the flat plane of the sheet 11 at an angle larger than the critical angle of a valley line area.

On the other hand, diffused light radiated from a valley line area of a finger enters the flat plane of the sheet 11 via air between the skin of the finger and the sheet, and is emitted at an angle below the critical angle in the valley line area. There is no diffused light which is from a valley line portion of skin and is emitted from a valley line area of the flat plane of the sheet 11 at an angle equal to or more than the critical angle of the valley line area.

Therefore, a skin pattern image of high contrast can be obtained by photographing light which is emitted from ridge line areas of the flat plane of the sheet 11 at an angle equal to or more than the critical angle in the valley line areas of the sheet 11 and less than the critical angle in ridge line areas.

The lines with an arrow described in FIG. 25 indicate an example of an optical path of light emitted at an angle larger than the critical angle of the valley line area. As shown in the example of FIG. 25, light that is emitted from the sheet 11 and enters the sheet 12 at a large angle is emitted at an angle nearer to the normal direction of the sheet 12 than the incident angle by refraction. By an effect of the sheet 12, light which is emitted from a ridge line area of the flat plane of the sheet 11 at an angle equal to or more than the critical angle in a valley line area of the sheet 11 and less than the critical angle in the ridge line area is refracted and emitted from the prism plane of the sheet 12 at an angle near the normal direction of the sheet 12. Accordingly, a skin pattern image of high contrast can be obtained by photographing the sheet 11 and the sheet 12 from an roughly normal direction of the sheet 11 and the sheet 12 by the imaging unit 20.

Therefore, when two prism sheets are overlapped like this exemplary embodiment, a skin pattern image of high contrast can be obtained by photographing the prism sheet the flat plane of which is being touched by skin, from a roughly normal direction of the prism sheet. Because photographing is performed from a roughly normal direction of the prism sheet, distortion of an obtained skin pattern image will also be small.

As above, this exemplary embodiment has the effect that a skin pattern image with high contrast and small distortion can be obtained.

The reason is that it has two overlapped prism sheets in its structure. By having two overlapped prism sheets in the structure, a skin pattern image of high contrast can be photographed from a roughly normal direction of the prism sheet as mentioned above. By performing photographing from a roughly normal direction of the prism sheets, a skin pattern image with small distortion compared with a skin pattern image which is photographed from an angle at which illumination light entering a single prism sheet from the prism plane side is totally reflected by the flat plane of the prism sheet can be obtained.

[Second Exemplary Embodiment]

Next, the second exemplary embodiment of the present invention will be described in detail with reference to a drawing.

FIG. 4 is a block diagram illustrating a structure of a fingerprint image matching system of this exemplary embodiment.

Referring to FIG. 4, a fingerprint image matching system of this exemplary embodiment includes a skin pattern image collection device 100 and a skin pattern matching device 200.

Because this skin pattern image collection device 100 is the same as the skin pattern image collection device 100 of the first exemplary embodiment shown in FIG. 1, description will be omitted.

The skin pattern matching device 200 includes a control unit 50, an image correction unit 60, a feature extraction unit 70, a matching unit 80 and a memory unit 90.

The control unit 50 controls the skin pattern image collection device 100 to make it collect a skin pattern image, and reads a skin pattern image which the skin pattern image collection device 100 has collected from the skin pattern image collection device 100.

The image correction unit 60 corrects a skin pattern image received from the control unit 50 by image processing such that it will be an image suitable for feature extraction.

The feature extraction unit 70 extracts features for matching from the skin pattern image received from the image correction unit 60.

The matching unit 80 performs matching to determine whether two pieces of feature data are ones extracted from skin pattern images collected from same skin or not.

Next, an operation of this exemplary embodiment will be described in detail with reference to a drawing.

FIG. 5 is a diagram illustrating an example of an operation of a fingerprint image matching system of this exemplary embodiment.

First, the control unit 50 controls the skin pattern image collection device 100 and makes it collect a skin pattern image. Then, the control unit 50 reads the skin pattern image which the skin pattern image collection device 100 has collected from the skin pattern image collection device 100 (Step A1). The control unit 50 sends the read skin pattern image to the image correction unit 60. In case the control unit 50 stores a read skin pattern image, the control unit 50 stores the read skin pattern image in the memory unit 90. A skin pattern image which the control unit 50 sends to the image correction unit 60 or a skin pattern image which it stores in the memory unit 90 is image data digitalized so that it can be handled by a computer and the like. The digitalization may be carried out by the skin pattern image collection device 100 or by the control unit 50.

Next, the image correction unit 60 corrects the skin pattern image received from the control unit 50 by image processing so that it may become an image suitable for feature extraction (Step A2). Image processing which the image correction unit 60 performs is existing image processing like noise reduction, smoothing, contrast correction and correction of distortion, for example. The image correction unit 60 may be of a structure in which it reads a skin pattern image stored in the memory unit 90 from the memory unit 90 without receiving a skin pattern image from the control unit 50.

The image correction unit 60 sends the corrected skin pattern image to the feature extraction unit 70. In the case where a skin pattern image is stored, the image correction unit 60 stores a corrected skin pattern image in the memory unit 90.

Next, the feature extraction unit 70 extracts features for matching from the skin pattern image received from the image correction unit 60 (Step A3). The feature extraction unit 70 performs feature extraction by an existing feature extraction method. Also, it may be of a structure in which the skin pattern image for performing feature extraction is read from the memory unit 90.

The feature extraction unit 70 sends feature data extracted from the skin pattern image to the matching unit 80. The feature extraction unit 70 stores feature data extracted from the skin pattern image in the memory unit 90 if necessary.

Next, the matching unit 80 performs matching to determine whether two pieces of feature data received from the feature extraction unit 70 are ones extracted from a skin pattern image collected from same skin or not by an existing matching method (Step A4). The matching unit 80 may read two pieces of feature data for performing matching from the memory unit 90 without receiving them from the feature extraction unit 70. In addition, the matching unit 80 may perform matching of feature data received from the feature extraction unit 70 and feature data read from the memory unit 90.

A combination of two pieces of feature data which the matching unit 80 carries out matching is selected according to the purpose. For example, when wanting to identify a person, the matching unit 80 performs matching of feature data which the skin pattern image collection device 100 has collected and the matching unit 80 has performed feature extraction and feature data which is stored in the memory unit 90 in a manner associated with the person who is desired to be identified, for example. When wanting to discriminate a person, the matching unit 80 performs matching of feature data that the skin pattern image collection device 100 has collected and the matching unit 80 has performed a feature extraction and each piece of feature data stored in the memory unit 90, for example. It is supposed that, as a result of matching, an individual who is associated with feature data which is most likely to be data extracted from a skin pattern image collected from the same skin is an individual from whom the skin pattern image which has been collected by the above-mentioned skin pattern image collection device 100 and the matching unit 80 has performed feature extraction. The matching unit 80 may perform matching of pieces of feature data stored in the memory unit 90 between themselves, or may perform matching of other combinations of feature data.

As above, this exemplary embodiment has an effect that the matching accuracy improves because matching is performed based on a striped pattern image of high contrast and small distortion.

The reason is that the skin pattern image collection device 100 has two overlapped prism sheets in its structure. By having two overlapped prism sheets in its structure, a skin pattern image of high contrast can be photographed from a roughly normal direction of the prism sheets as describe above. By performing photographing from a roughly normal direction of the prism sheets, a skin pattern image with small distortion compared with a skin pattern image which is photographed from an angle at which illumination light entering a single prism sheet from the prism plane side is totally reflected by the flat plane of the prism sheet can be obtained.

In order to perform matching of skin patterns by skin pattern images, after generating by image processing skin pattern images of skin patterns photographed in the obtained skin pattern images as if the generated skin pattern images are observed from the normal direction of the prism sheets, feature extraction needs to be performed using the generated skin pattern images. In the case of a skin pattern image which is photographed from an angle at which total reflection is caused by the flat plane of a prism sheet, because distortion is large, an error of the skin pattern image which is generated by image processing as if seen from the normal direction of a prism sheet will be large. On the other hand, in the case of a skin pattern image photographed from a roughly normal direction of the prism sheets, because distortion is small, an error of the skin pattern image which is generated from the photographed skin pattern image as if seen from the normal direction of the prism sheet will be small. By extracting feature data from a skin pattern image with a small error, a difference between pieces of feature data which have been extracted from skin pattern images collected from a same skin decreases, and the matching accuracy can be improved.

[Third Exemplary Embodiment]

Next, the third exemplary embodiment of the present invention will be described in detail with reference to a drawing.

FIG. 6 is a block diagram illustrating a structure of a fingerprint image matching system of this exemplary embodiment. Hereinafter, description will be made centering on a point of difference between this exemplary embodiment and the second exemplary embodiment.

Referring to FIG. 6, a fingerprint image matching system of this exemplary embodiment includes a skin pattern image collection device 101 and the skin pattern matching device 200.

Because the structure of the skin pattern matching device 200 of this exemplary embodiment is the same as the structure of the skin pattern matching device 200 according to the second exemplary embodiment, description will be omitted.

When this exemplary embodiment and the second exemplary embodiment are compared, the structure of the skin pattern image collection device 101 is different.

FIG. 7 is a diagram illustrating a structure of the skin pattern image collection device 101 in this exemplary embodiment. Hereinafter, description will be made centering on the point of difference between the skin pattern image collection device 101 and the skin pattern image collection device 100 in the first exemplary embodiment. Also, description will be made supposing that a part from which a skin pattern is collected is a finger, and a collected image is a fingerprint image. However, as mentioned above, the part from which a skin pattern is collected is not limited to a finger as long as there is unevenness in skin and it is the part from which a pattern of skin can be collected.

Referring to FIG. 7, the skin pattern collection device 101 in this exemplary embodiment includes a two-ply sheet 13, an imaging unit 20, a holding unit 30 which holds the sheet 13 and a reflecting unit 40.

The sheet 13 is the same as one made by stacking the sheet 11 and the sheet 12 of the first exemplary embodiment. Accordingly, detailed description of the sheet 13 will be omitted. The flat plane of the sheet 13 is the flat plane of the sheet 11. The prism plane of the sheet 13 is the prism plane of the sheet 12. However, the sheet 13 has flexibility.

The holding unit 30 holds around the sheet 13 in a manner that the sheet 13 is movable. Holding in a movable manner means that the holding unit 30 supports around the sheet 13 without fixing it so that the sheet 13 may move within a fixed range. The movable range of the sheet 13 should be a range enough for the sheet 13 to bend and touch a finger as mentioned later. It is desirable to provide a mechanism, in either one or both of the sheet 13 and the holding unit 30, to prevent the sheet 13 from dropping off from the holding unit 30. As such mechanism, a mechanism in which protrusions are provided in the ends of the sheet 13 and the holding unit 30 and which prevents the sheet 13 from dropping off from the holding unit 30 by those two protrusions is conceivable, for example. When the sheet 13 moves due to such as its transformation, such protrusions prevent the sheet 13 from dropping off from the holding unit 30 by protrusions provided in the sheet 13 getting stuck with projections provided in the holding unit 30. Portions which the holding unit 30 holds may be two sides of the sheet 13 facing each other, may be any three sides or may be four sides. The holding unit 30 may hold the corners of the sheet 13. This applies to a case where a shape of the sheet 13 is not a quadrangle. In that case, the holding unit 30 may hold the sheet 13 by no smaller than five positions.

When force is added to the sheet 13, for example, in the normal direction of the sheet 13, the sheet 13 bends more largely than a case where the periphery is fixed, because the periphery of the sheet 13 is not fixed. Accordingly, when a finger or the like is made to touch the sheet 13 and pushed, the sheet 13 comes in contact with a surface of a finger and the like at a range wider than that of a case where the sheet is rigid and does not bend or a case where the sheet is made difficult to bend by fixing its periphery, for example.

By reflecting a pattern in a part where it is difficult to be photographed by the imaging unit 20 due to a bend when force is added to the sheet 13 among parts of the sheet 13 touched by skin, the reflecting unit 40 makes the pattern be photographed by the imaging unit 20. As the reflecting unit 40, a mirror can be used, for example. In the example of FIG. 7, although it has a structure which reflects an image at two positions, it may be configured so that it may reflect the image at no smaller than three positions according to a way of bending of the sheet 13. In addition, a position at which the reflecting unit 40 is installed should simply be a position which makes an image of a roughly normal direction of the sheet 13 at the time of transformation be reflected toward the imaging unit 20. The shape of the sheet 13 at the time of transformation should be presumed, for example, by measuring a typical transformation of the sheet 13 when bent using an existing method.

The imaging unit 20 photographs the sheet 13 and the reflecting unit 40 simultaneously. By photographing the reflecting unit 40, the imaging unit 20 photographs an image obtained by reflecting a pattern of a part where it is difficult to be photographed by the imaging unit 20 due to a bend when force is added to the sheet 13, which is a pattern seen from a roughly normal direction of the sheet 13, by the reflecting unit 40.

FIG. 8 is a perspective view illustrating an arrangement of the sheet 13, the imaging unit 20, the holding unit 30 and the reflecting unit 40 of an example of the skin pattern collection device in this exemplary embodiment.

Next, an operation of this exemplary embodiment will be described in detail with reference to a drawing.

FIG. 9 is a front view illustrating an example of reflection by the reflecting unit 40 when photographing a fingerprint by making the sheet 13 be bent by the finger 1.

FIG. 10 is a perspective view illustrating the skin pattern collection device of this exemplary embodiment of a state that the sheet 13 is made to be bent by the finger 1. Although the skin pattern collection device in this exemplary embodiment includes the imaging unit 20, because the purpose of FIG. 10 is to indicate relation between the finger 1 and bend of the sheet 13, the imaging unit 20 is not indicated in FIG. 10. Hereinafter, description will be made based on FIG. 9.

Referring to FIG. 9, when a finger is made touch the sheet 13 and force is added toward the lower part of FIG. 9, the sheet 13 bends. A part near the center of the sheet 13 that is being bent is photographed by the imaging unit 20 directly. Because an angle between the normal in an end part of the sheet 13 that is being bent and the optic axis of the imaging unit 20 is large, in case the imaging unit 20 photographs the end part directly, distortion becomes large compared with a case where the part is photographed from a roughly normal direction of the part.

As a method to correct a fingerprint of a part where distortion of the sheet 13 is large to a fingerprint seen from the front, there is a method to presume distortion of the sheet 13 from an image photographed by the imaging unit 20, and perform correction, for example. However, because the distortion of the end part is large, an error of a corrected image becomes large.

On the other hand, as shown in FIG. 9, by reflecting by the reflecting unit 40 a part of the sheet 13 where distortion becomes large in case of photographing directly by the imaging unit 20, and by photographing a reflected image by the imaging unit 20, a fingerprint image of small distortion can be obtained. In order to generate one fingerprint image from a fingerprint image obtained by photographing the sheet 13 directly and an image reflected by the reflecting unit 40, a part where the sheet 13 is photographed directly and a part where the reflecting unit 40 is photographed should simply be connected by an existing image synthesizing method. For example, by photographing the sheet 13 and the reflecting unit 40 simultaneously and by cutting, from the photographed image, a part where the sheet 13 is photographed directly and a part where the reflecting unit 40 is photographed, respectively, and connecting them, a fingerprint image of small distortion can be obtained by one time of photographing. Such synthesizing and connecting of fingerprint images should simply be performed by the image correction unit 60 of the skin pattern matching device 200 shown in FIG. 6.

Because the whole operation of the fingerprint image matching system of this exemplary embodiment is the same as the whole operation of the fingerprint image matching system of the second exemplary embodiment shown in FIG. 5, description will be omitted.

As above, in addition to the effect of the second exemplary embodiment, this exemplary embodiment has a remarkable effect that the matching accuracy improves by collecting and performing matching of fingerprints in a wide range of a finger.

The reason is that, by the holding unit 30 having a structure to hold the flexible sheet 13 in a movable manner, a finger touches the sheet 13 in a range wider than that of a case where the sheet 13 does not bend or a case where it is difficult to bend. In case ranges of collected fingerprints are small, the matching accuracy declines because there are not many features included within the ranges. In case the ranges of the collected fingerprints are small, there are cases where a common area between two fingerprints for which matching is performed does not exist or is small. In such cases, even if fingerprints are of an identical finger, they will be often determined as different fingers. On the other hand, when a range of a collected fingerprint is wide, because a common area of two fingerprint images for which a matching is performed becomes wide, and, in addition, the numbers of extracted features of fingerprints increases, accuracy of matching improves. It has the similar effect for cases where a pattern of a skin surface having curved surfaces such as a palm, instead of a finger, is collected.

Also, this exemplary embodiment has a remarkable effect that, by collecting a fingerprint having small distortion caused by transformation of a finger to perform matching, accuracy of the matching is improved.

The reason is that, by having a structure in which the holding unit 30 holds the flexible sheet 13 in a movable manner, when adding force to the sheet 13 by making a finger from which a fingerprint is collected touch the sheet 13 at the time of fingerprint collection, the sheet 13 bends so that it may become a curved surface close to the shape of the finger even by weak force. When a fingerprint is collected by a sensor, which is of a planar shape and does not bend, which is a general fingerprint sensor, distortion is caused to a finger which is three-dimensional by pressing it against a fingerprint sensor which is a plane. In addition, when a fingerprint in a range as wide as possible is tried to be collected, distortion of the finger becomes large because the finger needs to be pressed against the sensor hard. Also, because the finger is not distorted into a same shape and the manner of distortion is different depending on a way of applying force, distortion of a fingerprint varies for each fingerprint image. Accordingly, in a case of a fingerprint image collected by such general fingerprint sensor, variation of distortion of a fingerprint caused by the distortion of a finger becomes large. On the other hand, in the skin pattern image collection device of this exemplary embodiment, a finger will not need to be pressed on the sheet 13 by strong force, and also the sheet 13 will bend to be a curved surface state. Accordingly, in the skin pattern image collection device of this exemplary embodiment, large distortion of a finger which occurs in case the fingerprint is collected by the above-mentioned plane sensor does not occur. Therefore, a fingerprint image of small distortion caused by distortion of a finger can be collected. When there is small distortion of a finger at the time of fingerprint collection, the matching accuracy improves because a difference in the collected fingerprint images becomes small if they are fingerprint images of an identical finger.

Further, this exemplary embodiment has an effect that matching accuracy improves because an error of correcting an collected fingerprint image to an image seen from the front of a sensor will be small even when the sheet 13 is of a curved surface.

The reason is that this exemplary embodiment has the reflecting unit 40 that reflects an image of the sheet 13, and the photographing unit 20 which photographs an image of the sheet 13 and the reflecting unit 40 in its structure. The imaging unit 20 photographs a part where an angle between the normal of the sheet 13 and the optic axis of the imaging unit 20 is large if the imaging unit 20 photographs the sheet 13 directly, after reflecting the part by the reflecting unit 40. By this, the imaging unit 20 can acquire an image from a roughly normal direction of that part. Further, by directly photographing a part which is of a roughly normal direction of the sheet 13 when the imaging unit 20 photographs the sheet 13 directly, the imaging unit 20 acquires an image from the roughly normal direction of the part. Therefore, by having the reflecting unit 40 in the structure, even if the sheet 13 is of a curved surface, an image from a roughly normal direction of the sheet 13 can be acquired for every part of the sheet 13. Accordingly, because an error when correcting an collected fingerprint image to an image seen from the front of a sensor can be made small, the matching accuracy of the matching using the fingerprint image improves.

[Fourth Exemplary Embodiment]

Next, the fourth exemplary embodiment of the present invention will be described in detail with reference to a drawing.

FIG. 11 is a diagram illustrating a structure of a fingerprint image matching system of this exemplary embodiment. Hereinafter, description will be made centering on a point of difference between this exemplary embodiment and the second exemplary embodiment.

Referring to FIG. 11, the fingerprint image matching system of this exemplary embodiment includes a skin pattern image collection device 102 and the skin pattern matching device 200.

Because the structure of the skin pattern matching device 200 in this exemplary embodiment is the same as the structure of the skin pattern matching device 200 in the second exemplary embodiment, description will be omitted.

When this exemplary embodiment is compared with the second and the third exemplary embodiments, there is a difference in a structure of the skin pattern image collection device 102.

FIG. 12 is a front view illustrating a structure of the skin pattern image collection device 102 in this exemplary embodiment. Hereinafter, description will be made centering on a point of difference between the skin pattern image collection device 102 in this exemplary embodiment and the skin pattern image collection device 101 in the third exemplary embodiment.

Referring to FIG. 12, this exemplary embodiment includes a two-ply sheet 14 with cuts, the imaging unit 20, a holding unit 31 which holds the sheet 14 and the reflecting unit 40.

Because the imaging unit 20 and the reflecting unit 40 are the same as those of the third exemplary embodiment, detailed description will be omitted.

The sheet 14 is made by providing cuts in the sheet 13 to make it easy to bend.

FIG. 14 is a top view illustrating an example of the sheet 14. The sheet 14 bends at a part 142 around the upper side of the sheet 14 shown in FIG. 14 so that a curvature in the longitudinal direction may become large. It bends at a part 141 around the left side of the sheet 14 and a part 143 around the right side so that a curvature of the lateral direction may become large. The sheet 14 does not need to be the shape shown in FIG. 14 if it bends as above at a part around the upper side and parts around the left side.

FIG. 13 is a diagram showing arrangement relation of the sheet 14, the imaging unit 20, the holding unit 31 and the reflecting unit 40 of an example of the skin pattern image collection device 102 seen from an obliquely upper direction.

The holding unit 31 shown in FIG. 13 is an example of the holding unit 31 that holds the sheet 14 at three positions. The shape of the holding unit 31 is not limited to the shape of FIG.

13. Regarding the holding unit 31, the shape of the holding unit 31 and the number of positions where the holding unit 31 holds the sheet 14 does not matter if it is one to hold the sheet 14 so that the sheet 14 may bend as above.

In the example of the sheet 14 shown in FIG. 14, the holding unit 31 holds the portions of the part 141 around the left side of the sheet 14, the part 142 around upper side and the part 143 around the right side in a movable manner.

Next, an operation of the skin pattern image collection device 102 of this exemplary embodiment will be described.

FIG. 15 is an example indicating transformation of the sheet 14 when photographing a fingerprint according to this exemplary embodiment. In order to express the shape of the sheet 14 clearly, the imaging unit 20, the holding unit 31 and the reflecting unit 40 are not indicated in FIG. 15.

Referring to FIG. 15, when the sheet 14 is pressed by a finger, the sheet 14 bends in such a way as to wind around the finger and touches the sides of the finger at portions of the part 141 around the left side and the part 143 around the right side. On the other hand, at the portion of the part 142 around the upper side, the sheet 14 bends so that it may be touched around the tip of the finger.

Because the whole operation of the fingerprint image matching system of this exemplary embodiment is the same as the operation of the fingerprint image matching system of the second exemplary embodiment shown in FIG. 5, description will be omitted.

As above, in addition to the effect of the third exemplary embodiment, this exemplary embodiment has an effect that the matching accuracy improves, because a fingerprint with the tip part of a finger in a wider range can be collected.

The reason is that it has a structure in which directions of easy bending in the part of the upper side of the sheet 14 and in the parts of the left and right sides of the sheet 14 are different. Therefore, as shown in FIG. 15, at the same time skin of the side portions of a finger touches the sheet 14 in a wide range, skin in a tip part of the finger touches the sheet 14 at a wide range. Therefore, in this exemplary embodiment, because a fingerprint image in a wider range can be collected, and a common area between two fingerprint images for which matching is performed becomes wide, and, in addition, the matching accuracy improves because the number of extracted fingerprint features increases.

[Fifth Exemplary Embodiment]

Next, the fifth exemplary embodiment of the present invention will be described in detail with reference to a drawing.

FIG. 16 is a block diagram illustrating a structure of a fingerprint image matching system of this exemplary embodiment. Hereinafter, description will be made centering on a point of difference between this exemplary embodiment and the third exemplary embodiment.

Referring to FIG. 16, a fingerprint image matching system of this exemplary embodiment includes a skin pattern image collection device 103 and the skin pattern matching device 200.

Because the structure of the skin pattern matching device 200 of this exemplary embodiment is the same as the structure of the skin pattern matching device 200 according to the third exemplary embodiment, description will be omitted.

When this exemplary embodiment and the third exemplary embodiment are compared, it is different in a structure of the skin pattern image collection device 103.

FIG. 17 is a front view illustrating a structure of the skin pattern image collection device 103 in this exemplary embodiment. Hereinafter, description will be made centering on a point of difference between the skin pattern image collection device 103 in this exemplary embodiment and the skin pattern image collection device 101 in the third exemplary embodiment.

Referring to FIG. 17, the skin pattern image collection device 103 includes the sheet 13, an imaging unit 21 and the holding unit 30 that holds the sheet 13. Hereinafter, description will be made focusing on the difference between this exemplary embodiment and the third exemplary embodiment. Meanwhile, skin pattern image collection device 103 may include the sheet 14 and the holding unit 31 in the fourth exemplary embodiment instead of the sheet 13 and the holding unit 30. In that case, the sheet 13 and the holding unit 30 in the following description are changed to the sheet 14 and the holding unit 31. Further, the following description becomes description centering on a point of difference between this exemplary embodiment and the fourth exemplary embodiment.

Because the sheet 13 and the holding unit 30 are the same as the third exemplary embodiment, description will be omitted.

An imaging unit 21 includes a plurality of imaging units which photograph the sheet 13 from a plurality of directions. By the plural imaging units, the imaging unit 21 directly photographs the part of the sheet 13, which the imaging unit 20 of the third exemplary embodiment photographs, and the part of the sheet 13, whose image reflected by the reflecting unit 40 is photographed by the imaging unit 20, respectively.

Next, an operation of the skin pattern image collection device 103 of this exemplary embodiment will be described with reference to a drawing.

FIG. 18 is a front view illustrating a structure of the skin pattern image collection device in this exemplary embodiment when collecting a fingerprint.

Referring to FIG. 18, each of the imaging units of the imaging unit 21 photographs the sheet 13 that is bent by touch of a finger from a different direction, separately. The position of each of the imaging units of the imaging unit 21 is a position at which the sheet 13 can be photographed from, as accurately as possible, a normal direction of the bent sheet 13. The position at which each of the imaging units of the imaging unit 21 is installed should be a position selected and decided from the positions at which the sheet 13 at the time of bending can be photographed from a roughly normal direction and which are obtained in advance by measuring, for example, a typical transformation of the sheet 13 when bending.

By synthesizing fingerprint images photographed separately by the plural imaging units included in the imaging unit 21 by an existing arbitrary image synthesizing method, a fingerprint image including patterns of a finger surface in a wide range can be obtained.

Because the whole operation of the fingerprint image matching system of this exemplary embodiment is the same as the operation of the fingerprint image matching system of the second exemplary embodiment shown in FIG. 5, description will be omitted.

As above, this exemplary embodiment has a remarkable effect that, in addition to the effect of the second exemplary embodiment, by collecting fingerprint images of small distortion caused by distortion of fingers and performing matching using the collected fingerprint images like the third exemplary embodiment, the accuracy of matching improves.

The reason is that the holding unit 30 has a structure which holds the sheet 13 having flexibility in a movable manner. Distortion of a finger becomes small because the sheet 13 has flexibility and bends. When distortion of a finger becomes small, a difference in fingerprints for each image caused by distortion of the finger also becomes small in obtained fingerprint images. Accordingly, in this exemplary embodiment, the matching accuracy improves.

This exemplary embodiment further has an effect that, even if the sheet 13 is of a curved surface, the matching accuracy improves because an error when correcting a collected fingerprint image to an image seen from the front of a sensor can be made smaller. Also, this exemplary embodiment has a remarkable effect that accuracy of matching improves by collecting a fingerprint in a wide range of a finger to perform matching.

The reason is that it has a structure in which each of the plural imaging units of the imaging unit 21 photographs the sheet 13 from a roughly normal direction of a different portion of the sheet 13. By synthesizing a plurality of images photographed from the roughly normal directions, an error of an image seen from a roughly normal direction being caused in case of converting from an image photographed from a direction of a large angle to the normal direction can be made small. In this exemplary embodiment, because matching is performed based on fingerprint images of reduced errors, a difference between fingerprint images of matching targets is small, and the matching accuracy improves. By photographing different parts of the sheet 13 that bent using the plural imaging units, a fingerprint image in a wide range can be obtained.

[Sixth Exemplary Embodiment]

Next, the sixth exemplary embodiment of the present invention will be described in detail with reference to a drawing.

FIG. 19 is a block diagram illustrating a structure of a fingerprint image matching system of this exemplary embodiment. Hereinafter, description will be made centering on a point of difference between this exemplary embodiment and the third exemplary embodiment.

Referring to FIG. 19, the fingerprint image matching system of this exemplary embodiment includes a skin pattern image collection device 104 and the skin pattern matching device 200.

Because the structure of the skin pattern matching device 200 in this exemplary embodiment is the same as the structure of the skin pattern matching device 200 according to the third exemplary embodiment, description will be omitted.

When this exemplary embodiment and the third exemplary embodiment are compared, it is different in a structure of the skin pattern image collection device 104.

FIG. 20 is a diagram illustrating an example of a structure of the skin pattern image collection device 104 in this exemplary embodiment.

Referring to FIG. 20, the skin pattern image collection device 104 includes the sheet 13, an imaging unit 22, the holding unit 30 that holds the sheet 13 and a moving unit 221 for making the imaging unit 22 move. Hereinafter, description will be made centering on a point of difference between the skin pattern image collection device 104 of this exemplary embodiment and the skin pattern image collection device 101 of the third exemplary embodiment. Meanwhile, the skin pattern image collection device 104 may include the sheet 14 and the holding unit 31 in the fourth exemplary embodiment instead of the sheet 13 and the holding unit 30. In this case, the sheet 13 and the holding unit 30 in the following description are changed to the sheet 14 and the holding unit 31. Further, the following description becomes description centering on a point of difference between this exemplary embodiment and the fourth exemplary embodiment.

Because the sheet 13 and the holding unit 30 are the same as those of the third exemplary embodiment, description will be omitted.

By the moving unit 221, the imaging unit 22 can photograph the sheet 13 at various angles while moving.

The moving unit 221 is a unit for moving the imaging unit 22. The moving unit 221 is a rail, for example.

Next, an operation of a skin pattern photographing device 104 of this exemplary embodiment will be described with reference to a drawing.

FIG. 21 is a front view illustrating an example of a structure when photographing a fingerprint image by the skin pattern photographing device in this exemplary embodiment.

Referring to FIG. 21, the imaging unit 22 of the skin pattern photographing device 104 moves on the moving unit 221. The imaging unit 22 photographs the sheet 13 from various angles while moving on the moving unit 221. Although an example when the imaging unit 22 moves on the moving unit 221 that is a rail is described in FIG. 21, a moving method is not limited to a rail. Further, courses for moving may be, for example, two courses crossing at right angle to each other or may be various courses, instead of one course. The imaging unit 22 may be moved by, for example, a robot arm.

However, in each case, it is possible for the imaging unit 22 to move to a plurality of different positions from which the sheet 13 can be photographed from a roughly normal direction of the sheet 13. The imaging unit 22 can move to a position where a part of the sheet 13 which bends, in which an angle between the normal direction and the direction of the optical axis of the imaging unit 22 is large in case of photographing from a certain position, is able to be photographed from a roughly normal direction of the part, and can photograph the part.

For example the control unit 50 of the skin pattern matching device may perform control of the imaging unit 22 that moves by the moving unit 221.

As shown in FIG. 21, by a finger touching the sheet 13 and adding force, the sheet 13 is bent. While moving, the imaging unit 22 performs photographing a plurality of times from roughly normal directions of the sheet 13 being in the state that it is touched by a finger and is bent. Positions at which the imaging unit 22 photographs should be a position selected and decided from positions at which the sheet 13 at the time of being bent can be photographed from a roughly normal direction and which are obtained in advance, for example, by measuring a typical distortion of the sheet 13 when being bent.

In case one fingerprint image is synthesized from a plurality of obtained fingerprint images, the one fingerprint image may be generated by connecting using an existing method. Generation of a connected image may be performed by the image correction unit 60 of the striped pattern image matching device.

Photographing may be performed by taking a still picture a plurality of times, or by recording a moving picture. For the imaging unit 22, a sensor other than a plane sensor, such as a strip type sensor and a linear type sensor, may be used. Then, an existing method to synthesize a fingerprint image from the obtained images or moving picture of a strip type or a linear type may be used.

Because the whole operation of the fingerprint image matching system of this exemplary embodiment is the same as the whole operation of the second exemplary embodiment's pattern image matching system shown in FIG. 5, description will be omitted.

As above, in addition to the effect of the second exemplary embodiment, this exemplary embodiment has a remarkable effect that accuracy of matching improves, by collecting a fingerprint image, to perform matching, having small distortion caused by distortion of a finger, as is the case with the third exemplary embodiment.

The reason is that the holding unit 30 has a structure to hold the sheet 13 having flexibility in a movable manner. Because the sheet 13 has flexibility and it bends, distortion of a finger becomes small. In case distortion of a finger is small, among obtained fingerprint images, a difference caused by distortion of the finger between fingerprints for each image is also small. Accordingly, in this exemplary embodiment, the matching accuracy improves.

Further, this exemplary embodiment has an effect that, even if the sheet 13 is of a curved surface, the matching accuracy improves because an error when correcting a collected fingerprint image to an image seen from the front of a sensor is made small. Also, this exemplary embodiment has a remarkable effect that accuracy of matching improves by collecting a fingerprint in a wide range of a finger and performing matching using the fingerprint.

The reason is that it has a structure in which, by the imaging unit 22 moving, for a plurality of different parts of the sheet 13, the imaging unit 22 photographs the part from a roughly normal direction of the part. Even if there is a part where an angle between a normal direction and the direction of the optic axis of the imaging unit 22 is large in case the sheet 13 is photographed by the imaging unit 22 from a given position, the imaging unit 22 can photograph the part from a roughly normal direction by moving. Therefore, distortion of a fingerprint image, which is generated from photographed images, in the case of seeing a fingerprint from a normal direction of a sheet, is small. Also, a fingerprint image in a wide range can be obtained by moving the imaging unit 22 and photographing different parts of the sheet 13 which is bent.

Although the present invention has been described with reference to the exemplary embodiments above, the present invention is not limited to the above-mentioned exemplary embodiments. Various changes which a person skilled in the art can understand within the scope of the present invention can be performed in the composition and details of the present invention.

This application is based upon and claims the benefit of priority from Japanese patent application No. 2010-009747, filed on Jan. 20, 2010, the disclosure of which is incorporated herein in its entirety.

BRIEF DESCRIPTION OF THE DRAWINGS

FIG. 1 is a front view illustrating a structure of a skin pattern image collection device corresponding to the first exemplary embodiment according to the present invention.

FIG. 2 is a perspective view showing an example of a prism sheet

FIG. 3 is a front view illustrating an arrangement when collecting a skin pattern image of the first exemplary embodiment.

FIG. 4 is a block diagram showing a structure of a fingerprint image matching system corresponding to the second exemplary embodiment according to the present invention.

FIG. 5 is a flow chart illustrating an operation of the second, third, fourth, fifth and sixth exemplary embodiments according to the present invention.

FIG. 6 is a block diagram illustrating a structure of a fingerprint image matching system corresponding to the third exemplary embodiment according to the present invention.

FIG. 7 is a front view illustrating a structure of a skin pattern image collection device in the third exemplary embodiment.

FIG. 8 is a perspective view illustrating a skin pattern image collection device in the third exemplary embodiment.

FIG. 9 is a front view illustrating the state of a skin pattern image collection device in the third exemplary embodiment when collecting a skin pattern image.

FIG. 10 is a perspective view illustrating the state of a skin pattern image collection device in the third exemplary embodiment when collecting a skin pattern image.

FIG. 11 is a block diagram illustrating a structure of a fingerprint image matching system corresponding to the fourth exemplary embodiment according to the present invention.

FIG. 12 is a front view illustrating a structure of a skin pattern image collection device in the fourth exemplary embodiment.

FIG. 13 is a perspective view illustrating a state of a skin pattern image collection device in the fourth exemplary embodiment.

FIG. 14 is a top view illustrating an example of a sheet used in the fourth exemplary embodiment.

FIG. 15 is a perspective view illustrating the state of a sheet and a finger when collecting a skin pattern image of a skin pattern image collection device in the fourth exemplary embodiment.

FIG. 16 is a block diagram illustrating a structure of a fingerprint image matching system corresponding to the fifth exemplary embodiment according to the present invention.

FIG. 17 is a front view illustrating a structure of a skin pattern image collection device in the fifth exemplary embodiment.

FIG. 18 is a front view illustrating the state of a skin pattern image collection device in the fifth exemplary embodiment when collecting a skin pattern image.

FIG. 19 is a block diagram illustrating a structure of a fingerprint image matching system corresponding to the sixth exemplary embodiment according to the present invention.

FIG. 20 is a front view illustrating a structure of a skin pattern image collection device in the sixth exemplary embodiment.

FIG. 21 is a front view illustrating the state of a skin pattern image collection device in the sixth exemplary embodiment when collecting a skin pattern image.
FIG. 22 is a diagram illustrating an example of a structure of a fingerprint collection device using a triangle pole prism.
FIG. 23 is a diagram illustrating an example of a structure of a fingerprint collection device using a prism sheet.
FIG. 24 is a diagram illustrating an example of an optical path of light totally reflected by a valley line part in the first exemplary embodiment.
FIG. 25 is a diagram illustrating an example of an optical path of diffused light in a ridge line part in the first exemplary embodiment.

DESCRIPTION OF THE CODES

Figure 1:
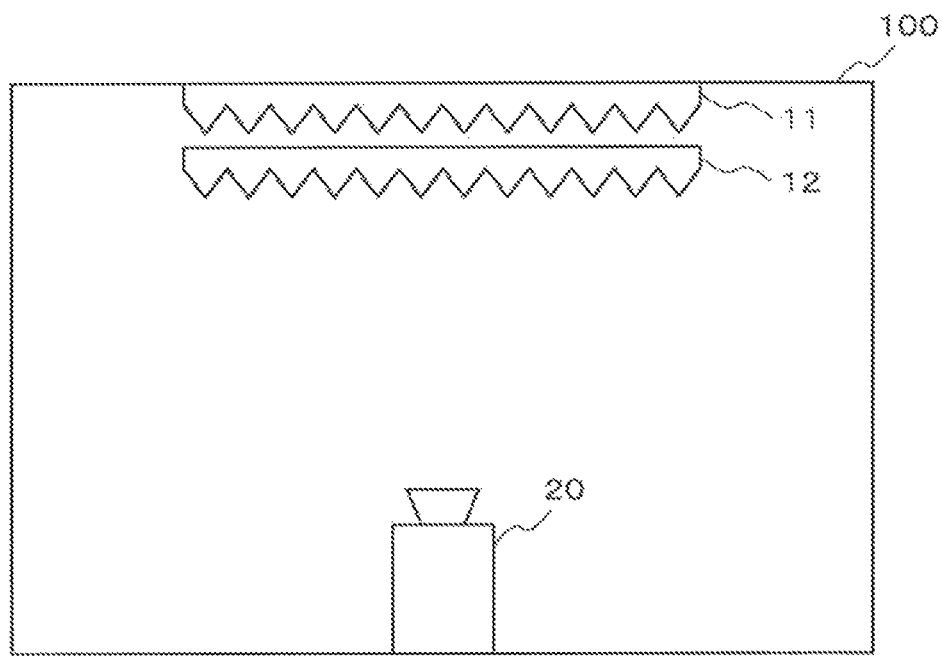
[FIG. 1]
Figure 2:
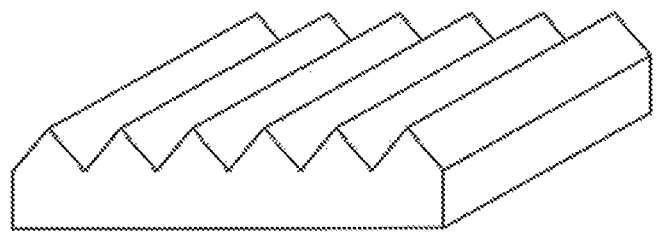
[FIG. 2]
Figure 3:
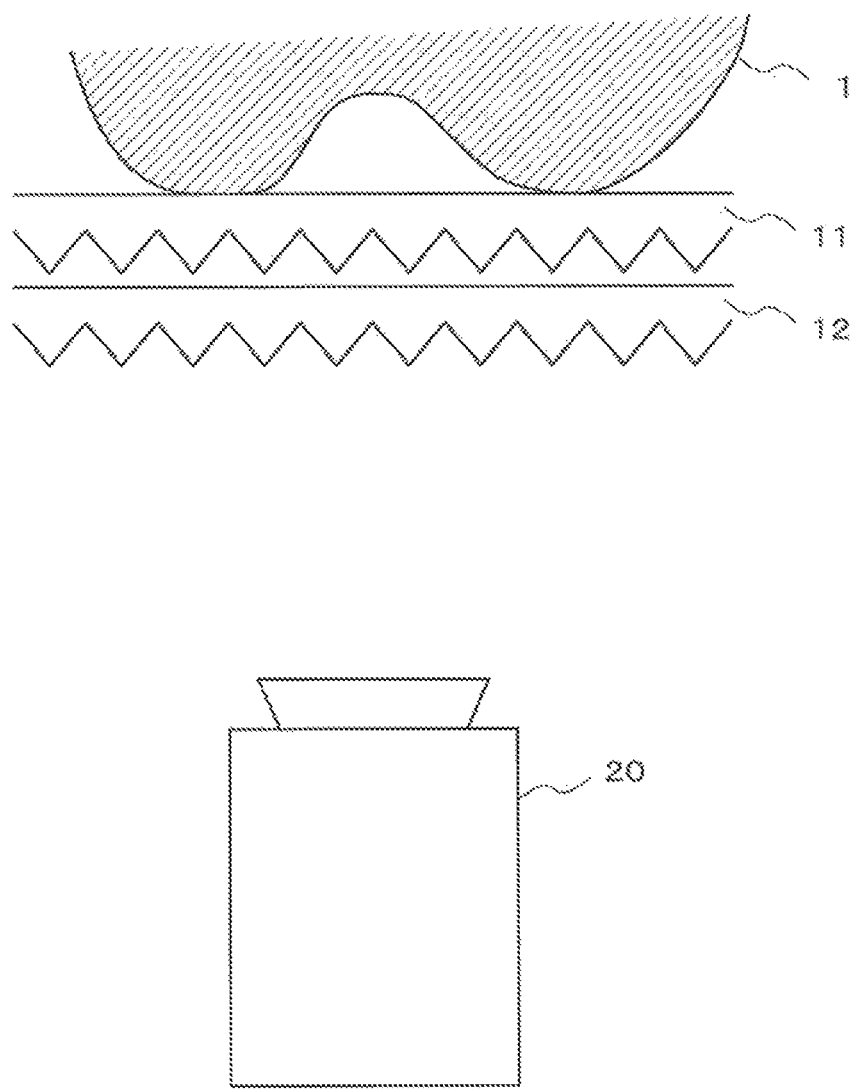
[FIG. 3]
Figure 4:
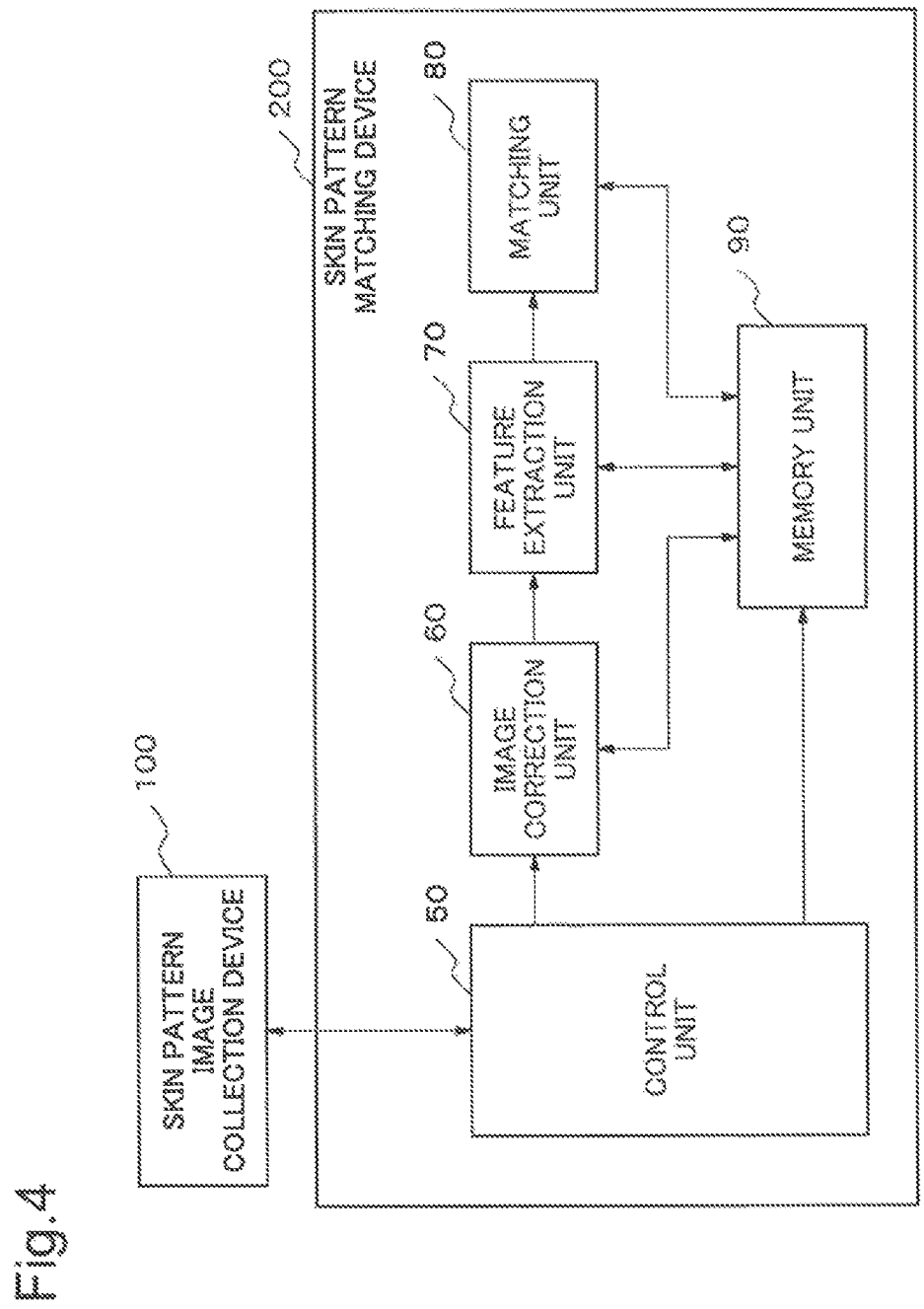
[FIG. 4]
Figure 5:
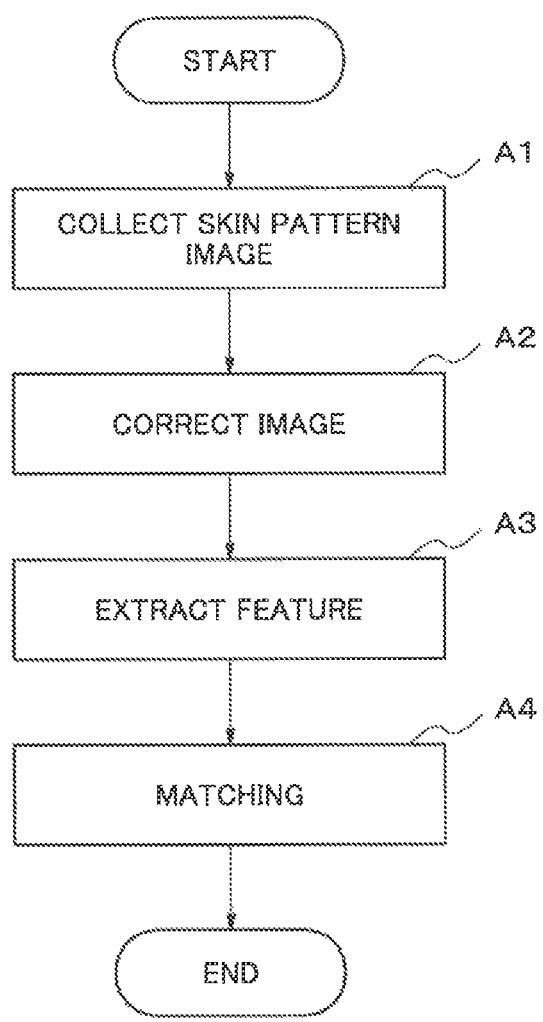
[FIG 5]
Figure 6:
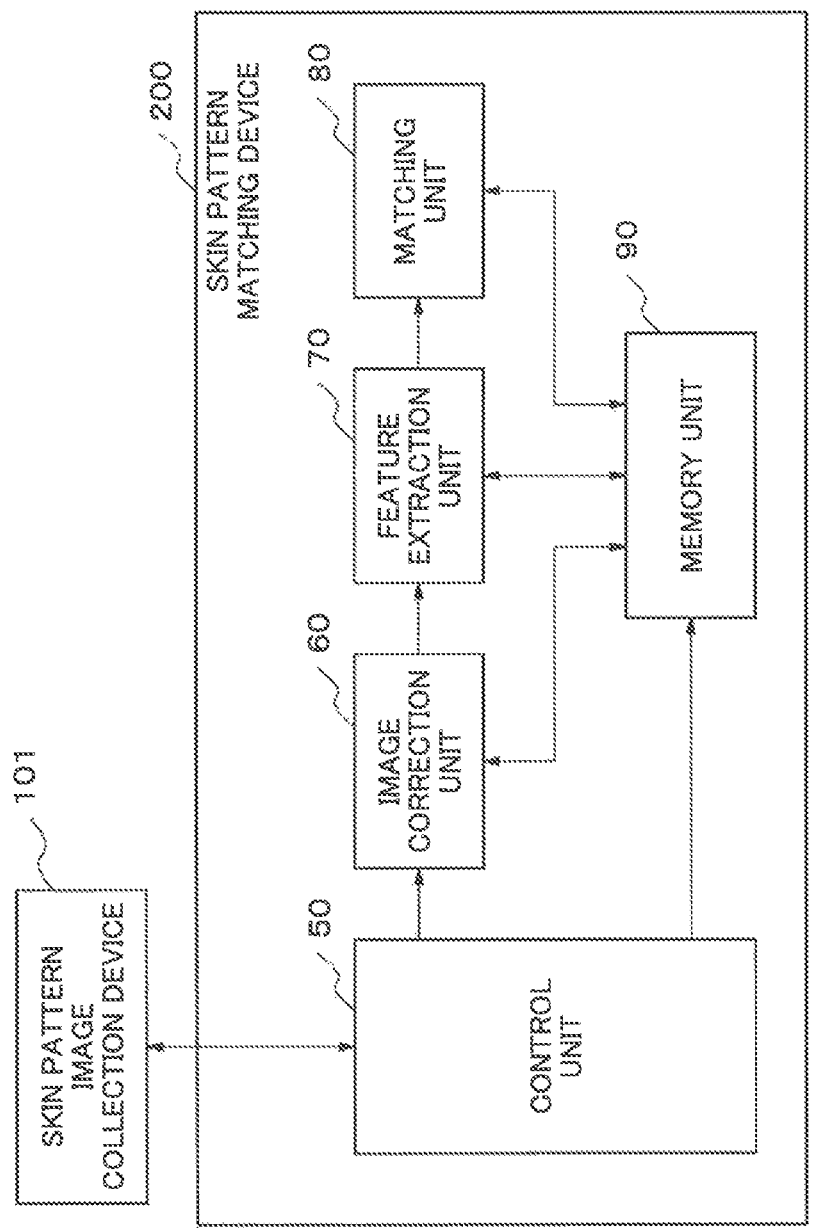
[FIG.6]
Figure 7:
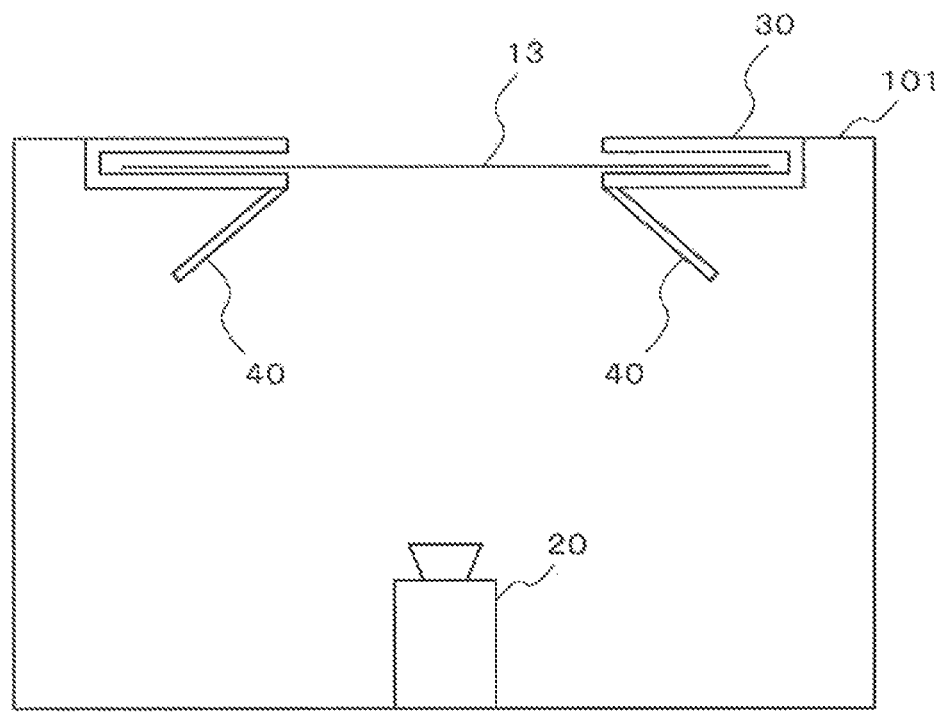
[FIG.7]
Figure 8:
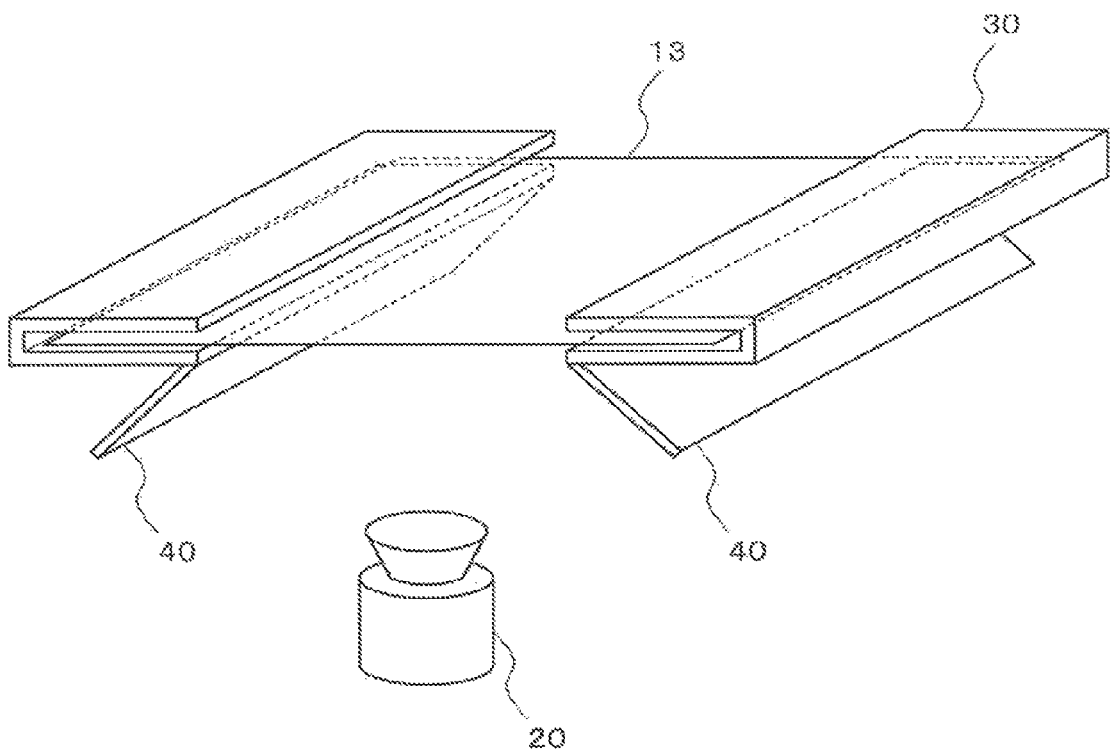
[FIG.8]
Figure 9:
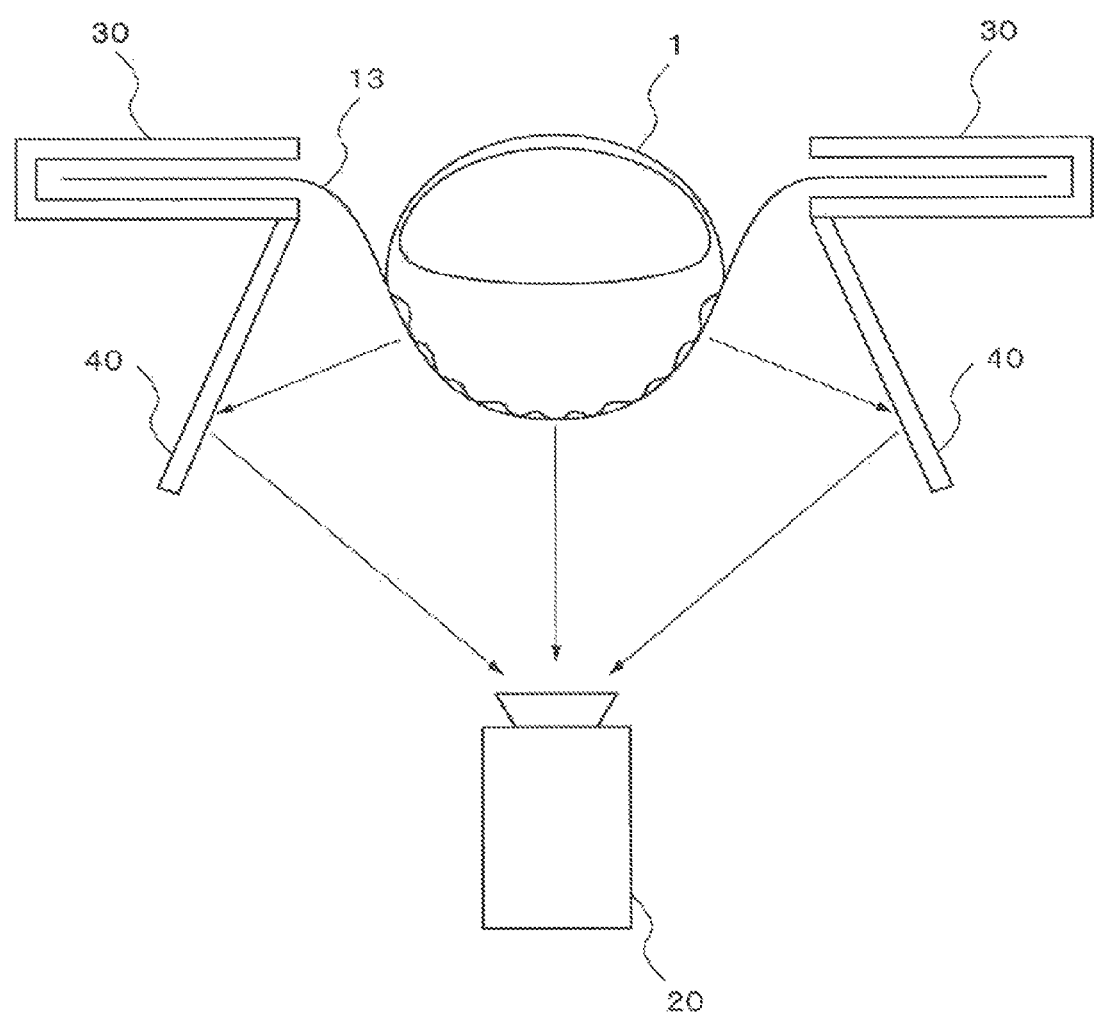
[FIG.9]
Figure 10:
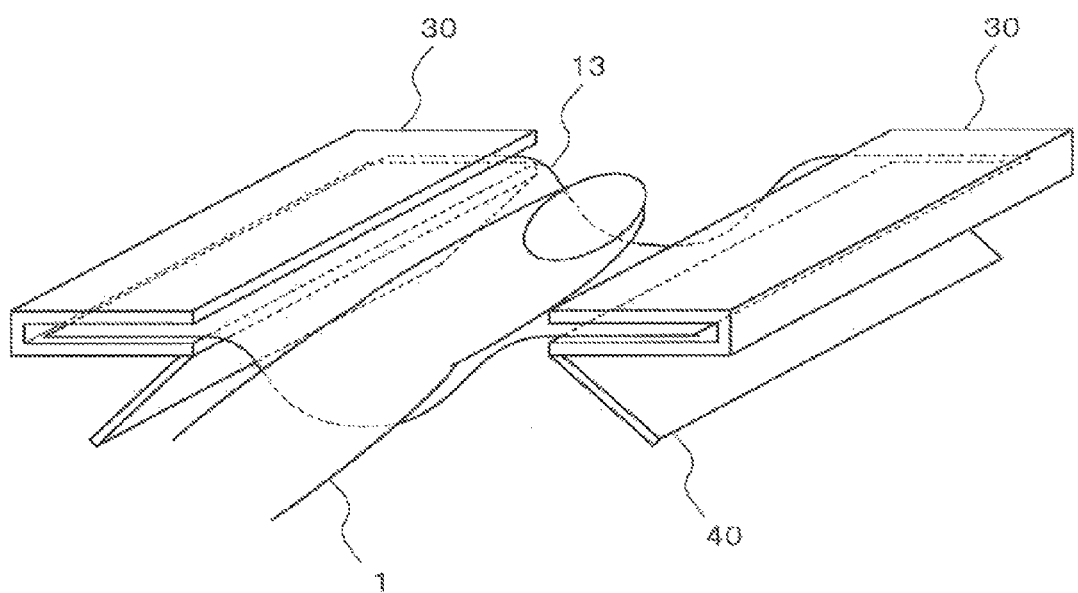
[FIG. 10]
Figure 11:
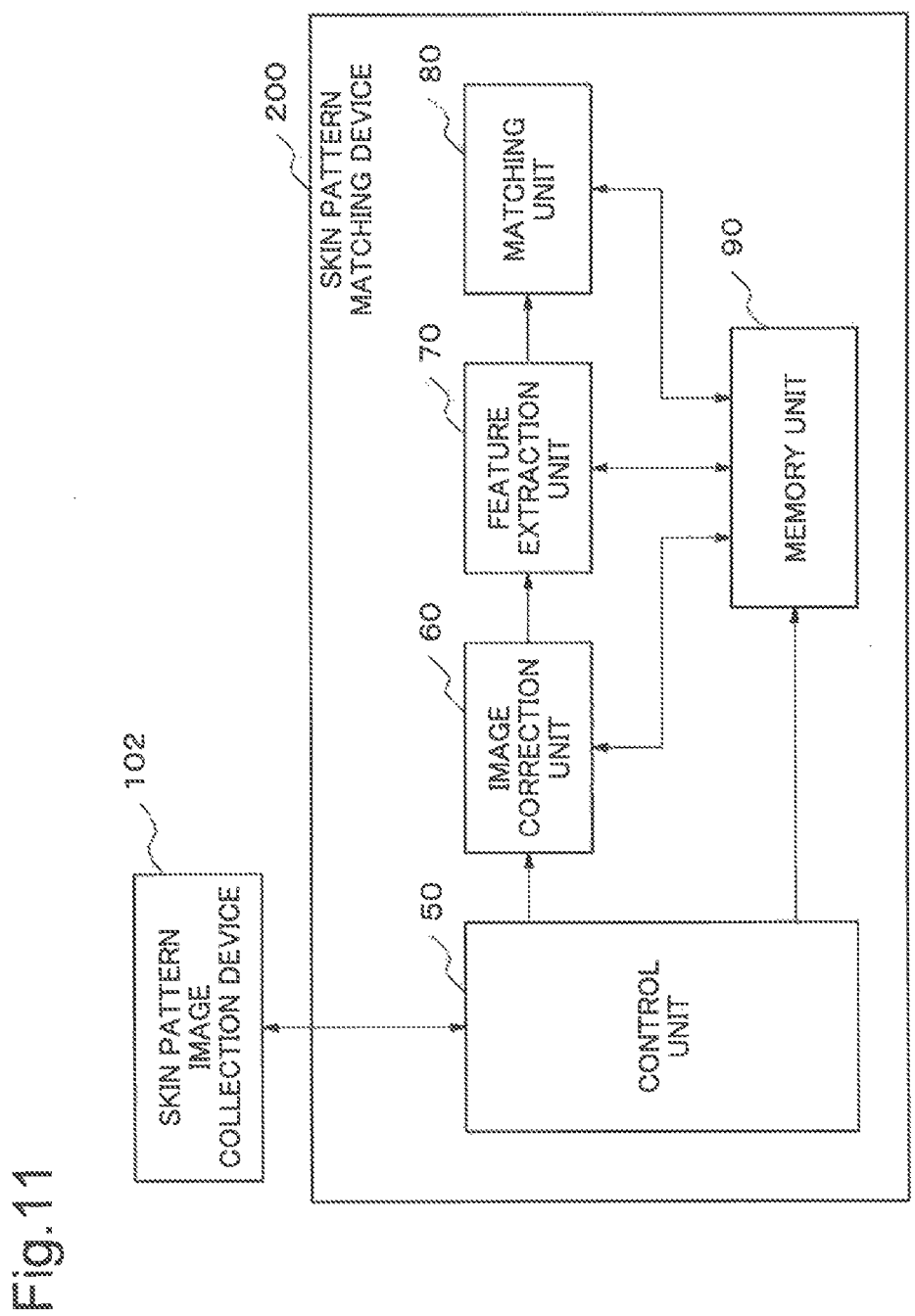
[FIG. 11]
Figure 12:
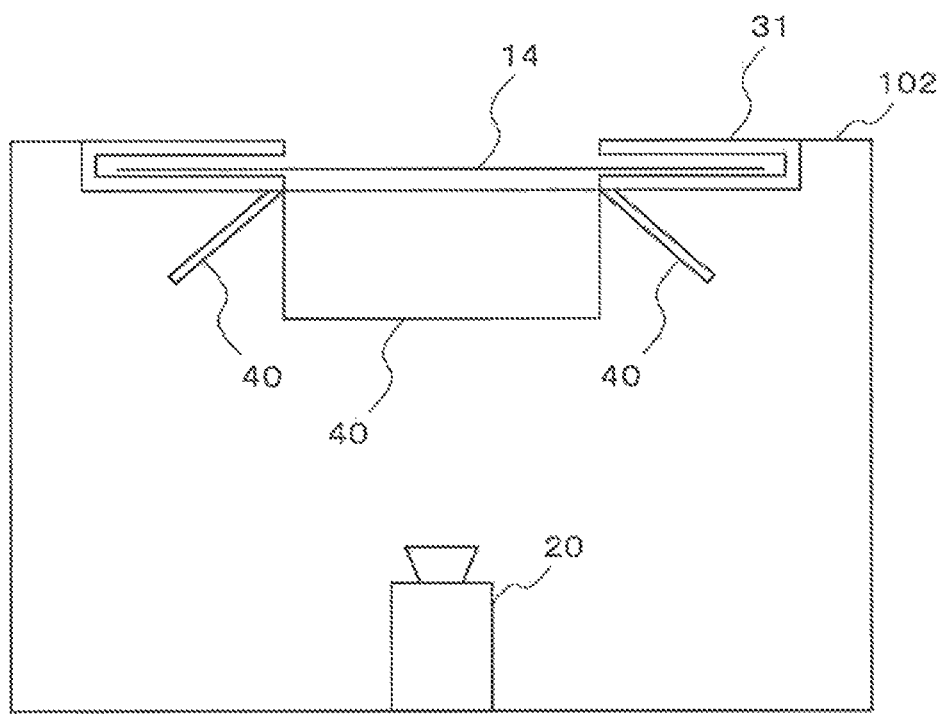
[FIG. 12]
Figure 13:
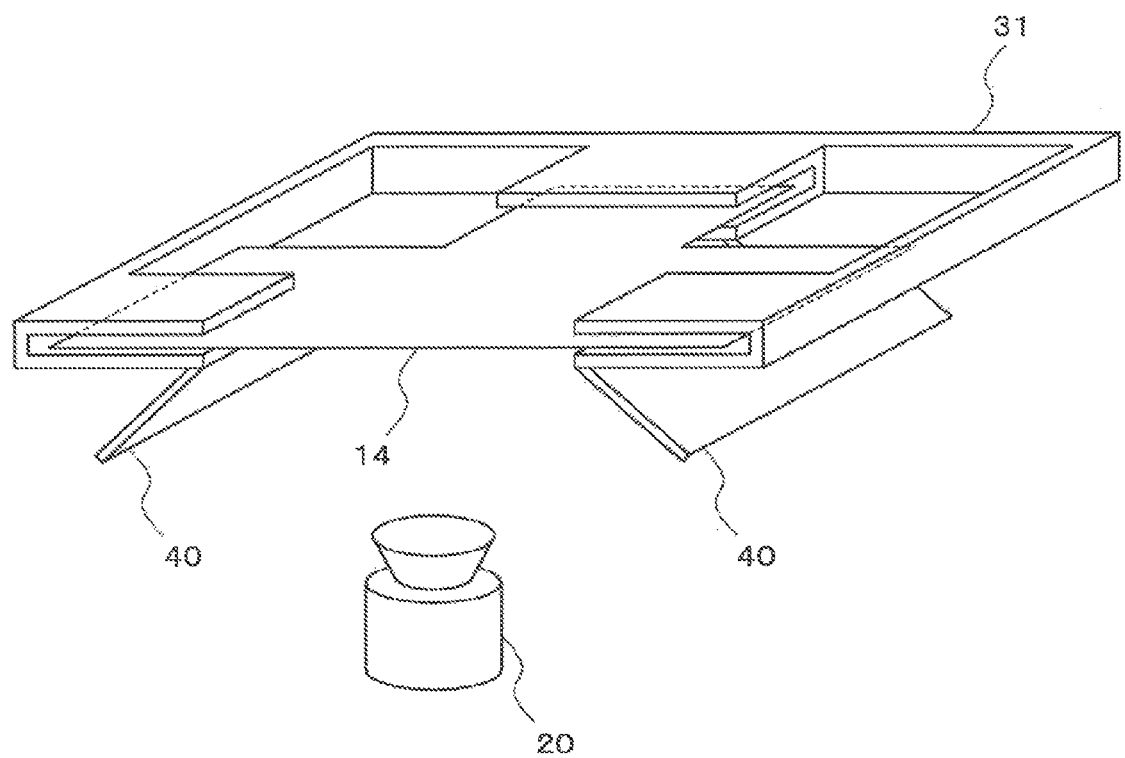
[FIG. 13]
Figure 14:
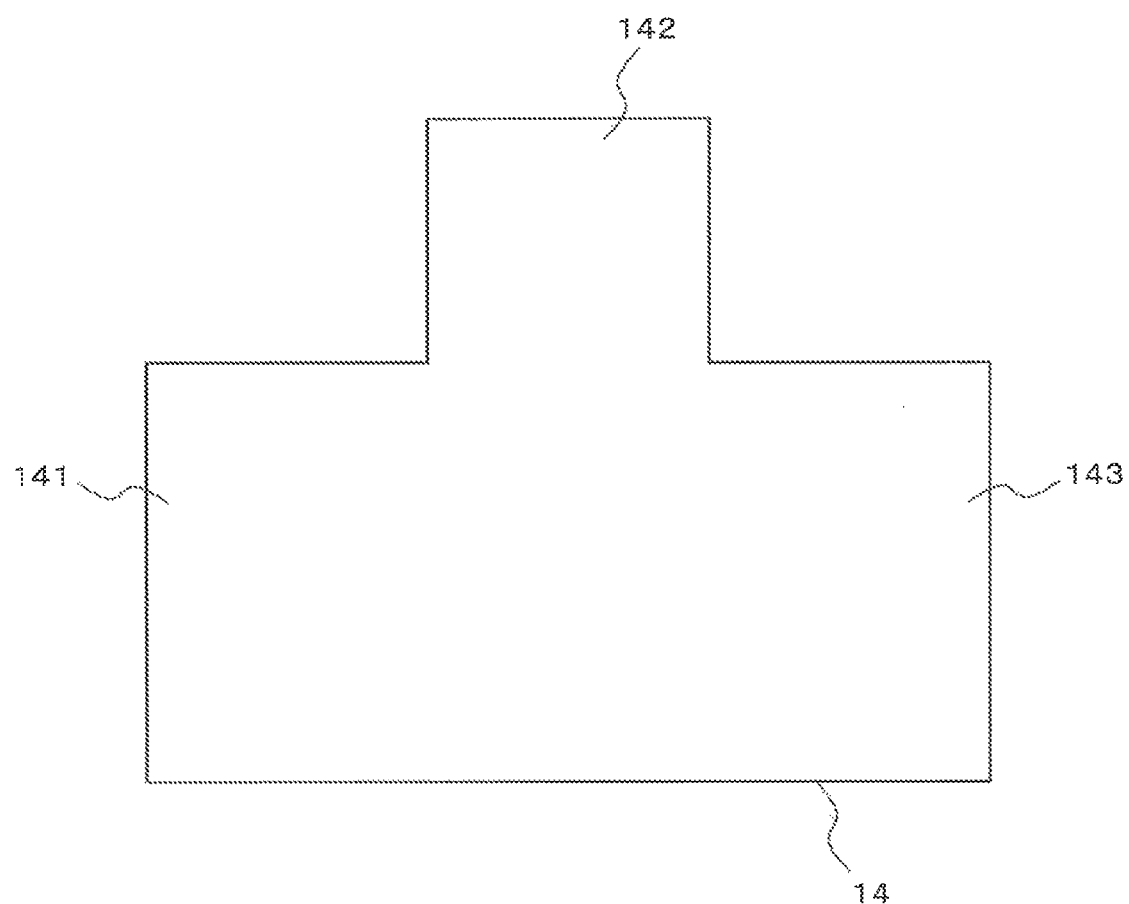
[FIG. 14]
Figure 15:
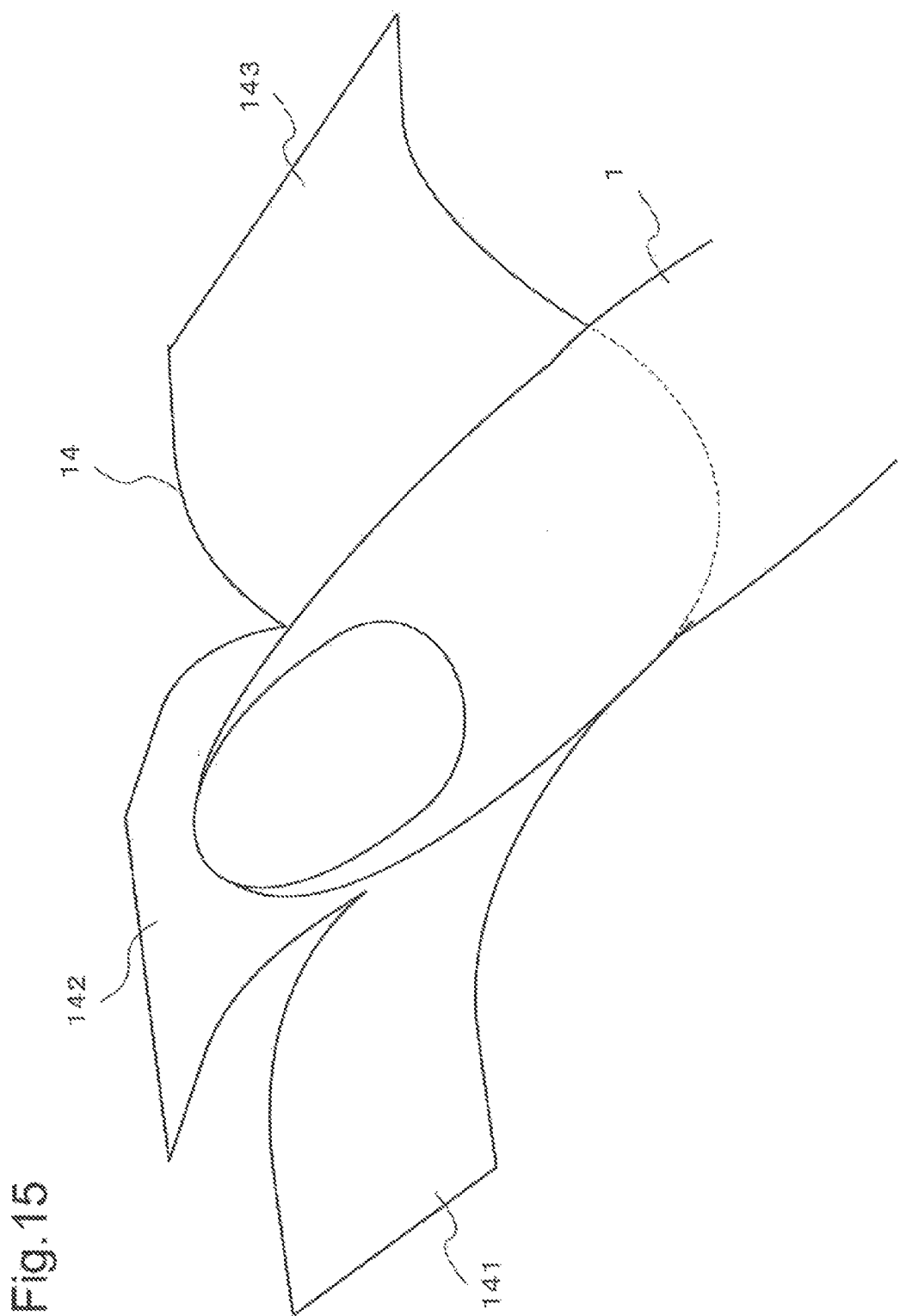
[FIG. 15]
Figure 16:
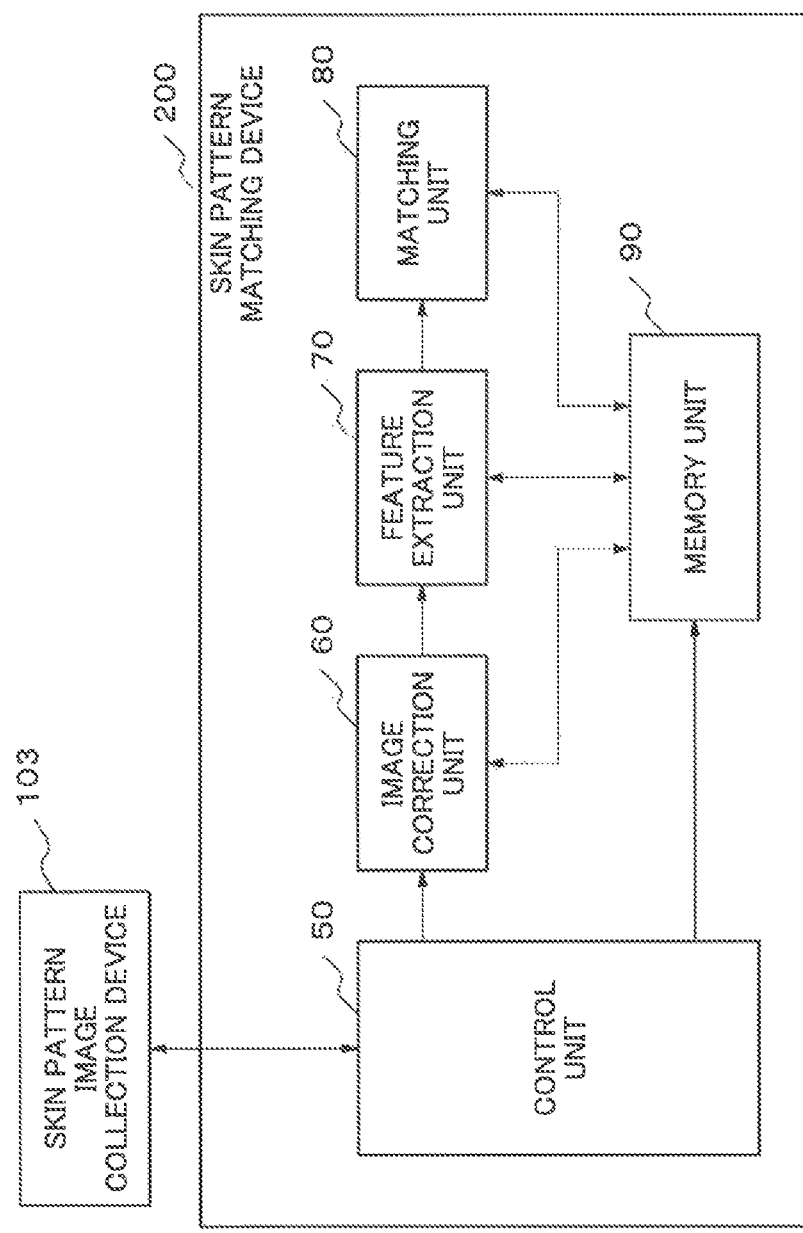
[FIG. 16]
Figure 17:
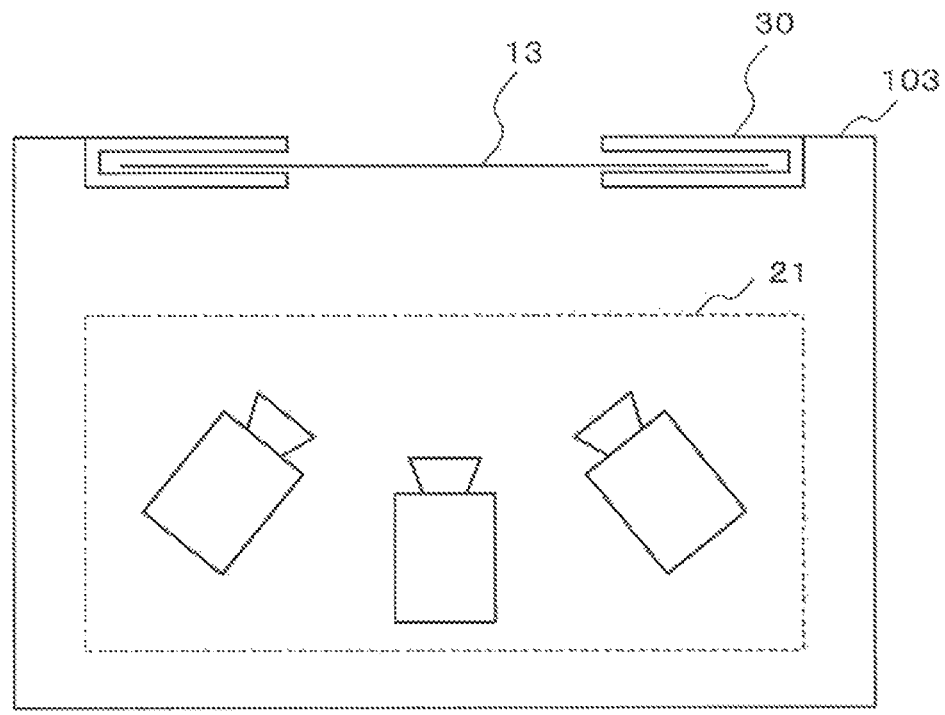
[FIG. 17]
Figure 18:
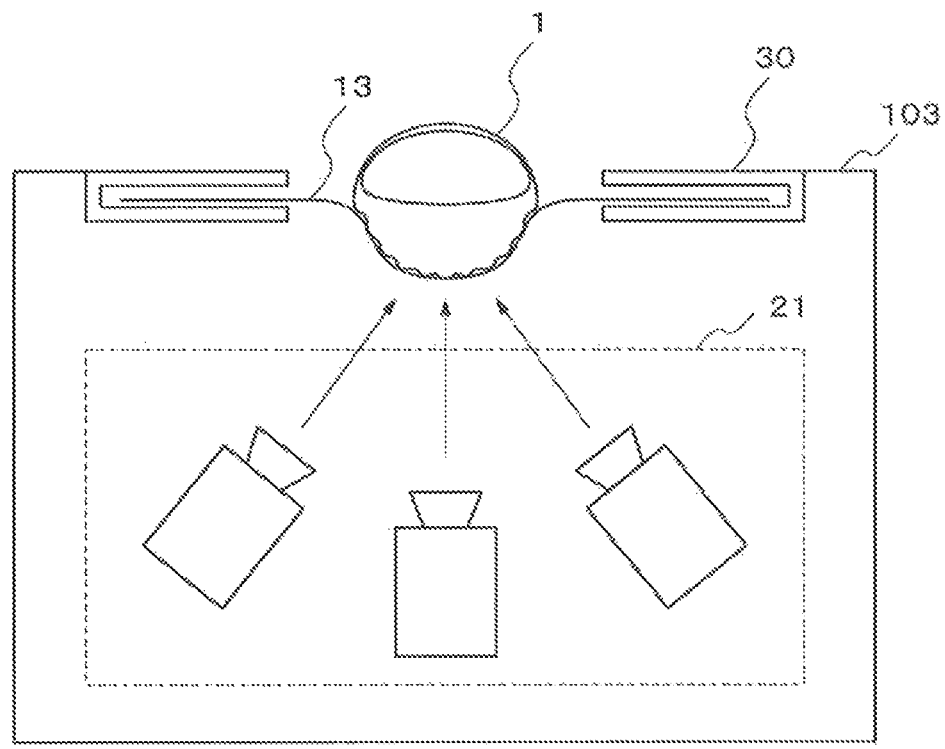
[FIG. 18]
Figure 19:
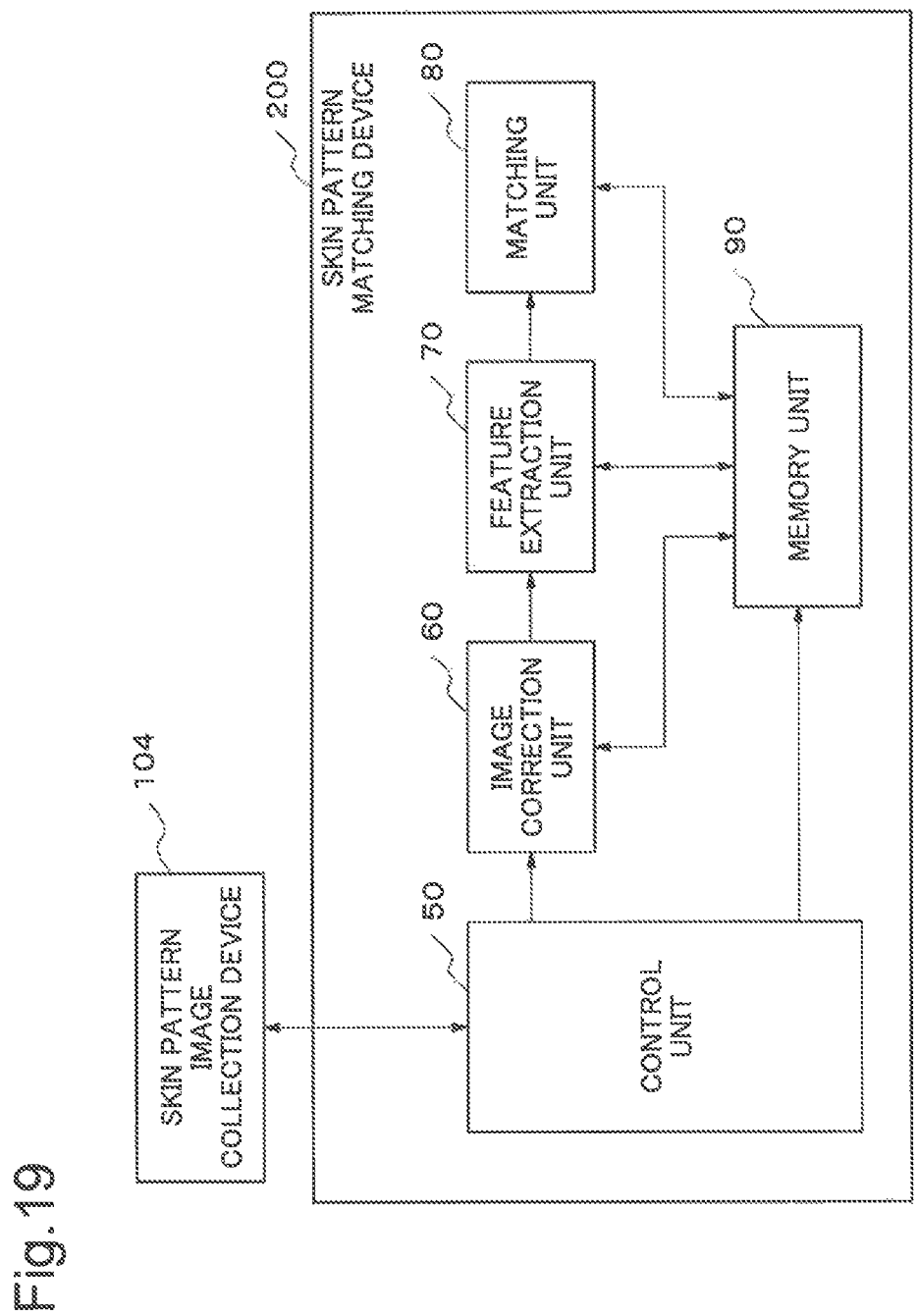
[FIG. 19]
Figure 20:
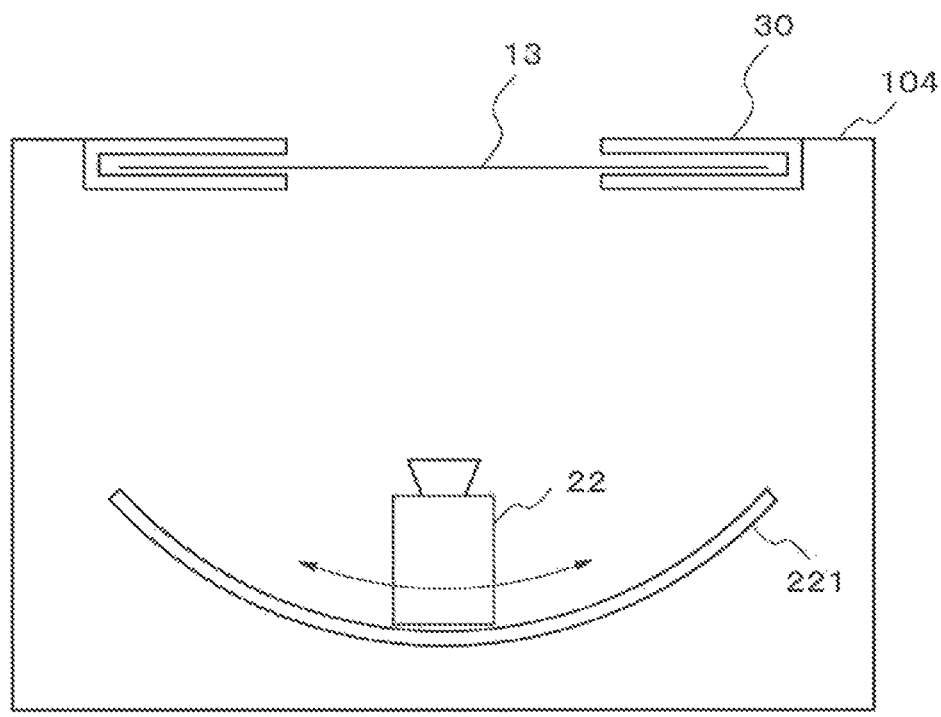
[FIG. 20]
Figure 21:
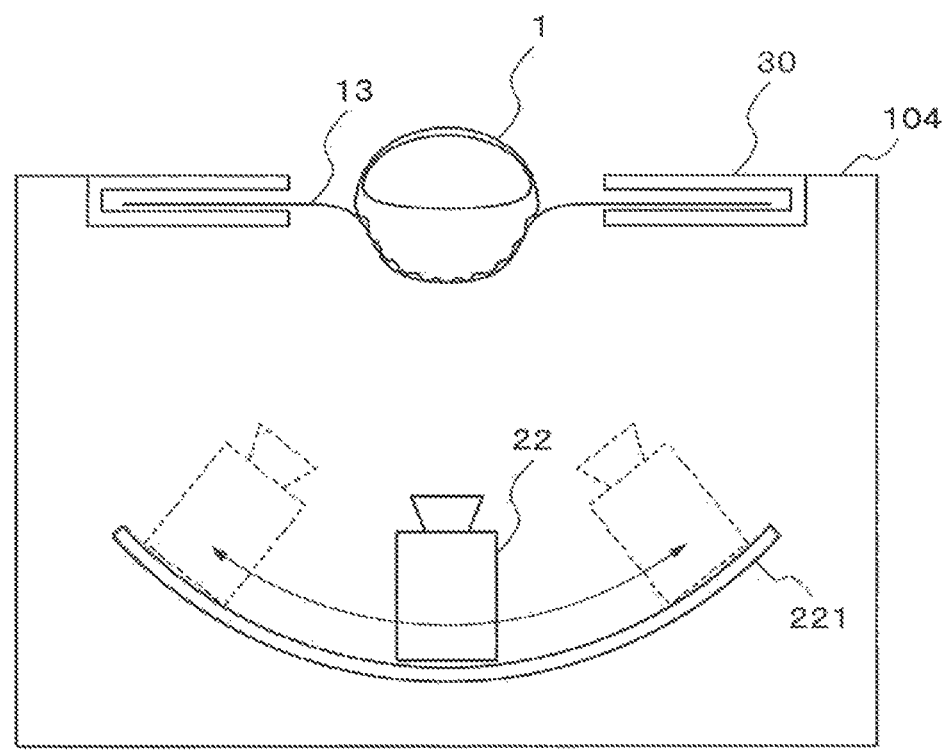
[FIG. 21]
Figure 22:
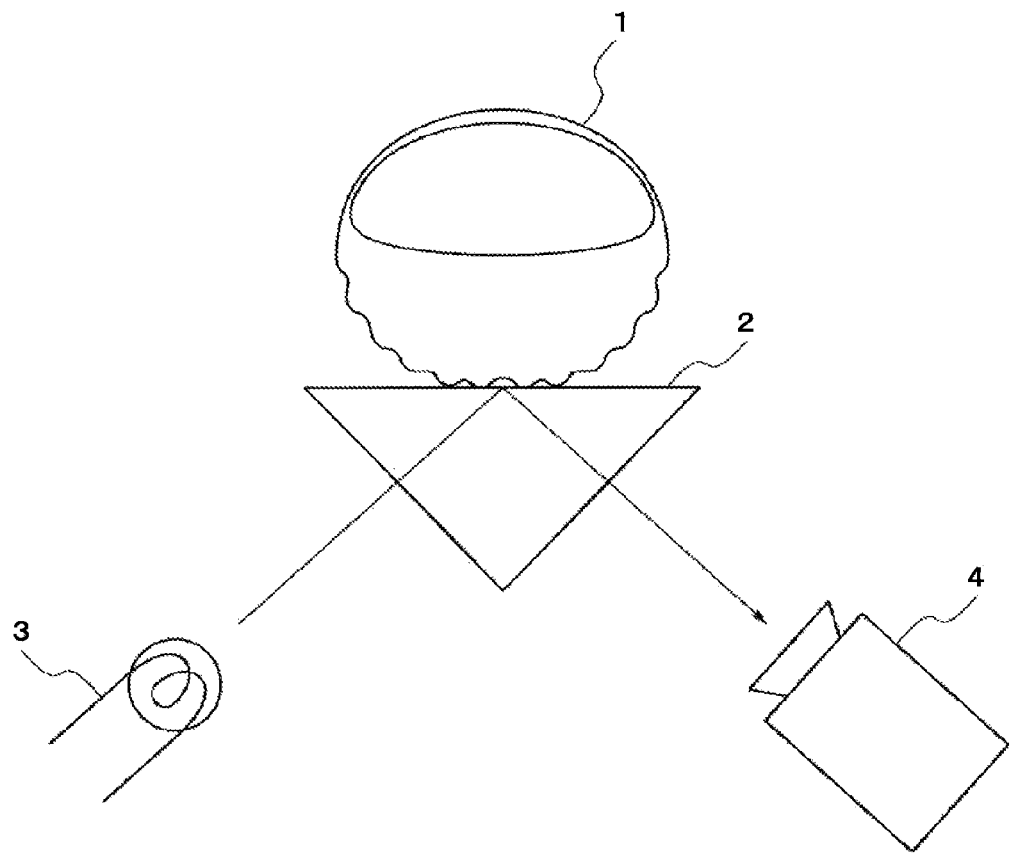
[FIG. 22]
Figure 23:
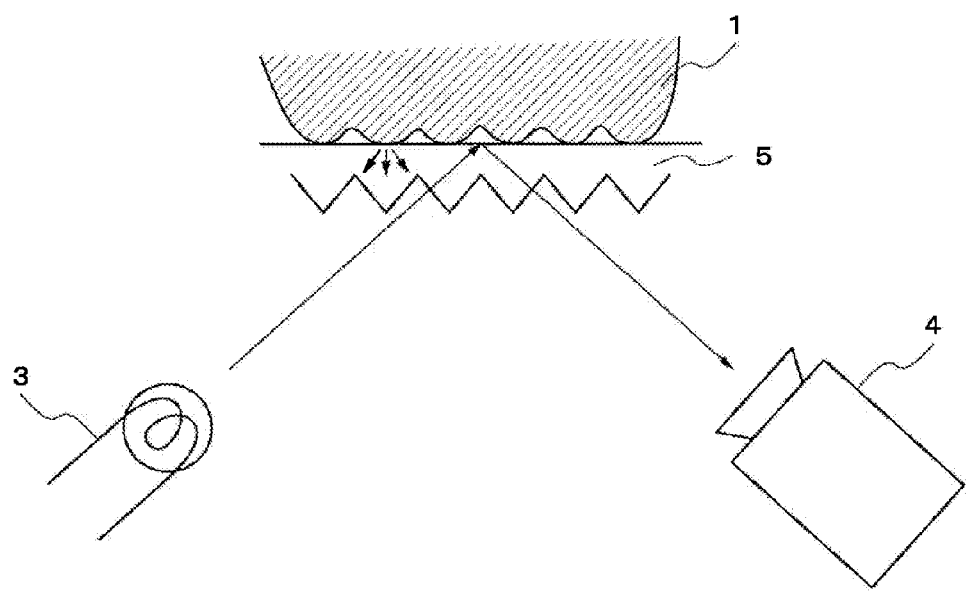
[FIG. 23]
Figure 24:
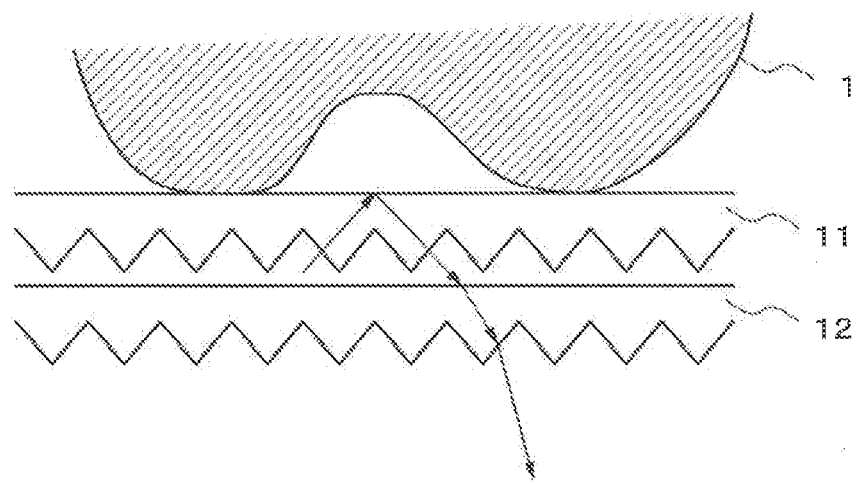
[FIG. 24]
Figure 25:
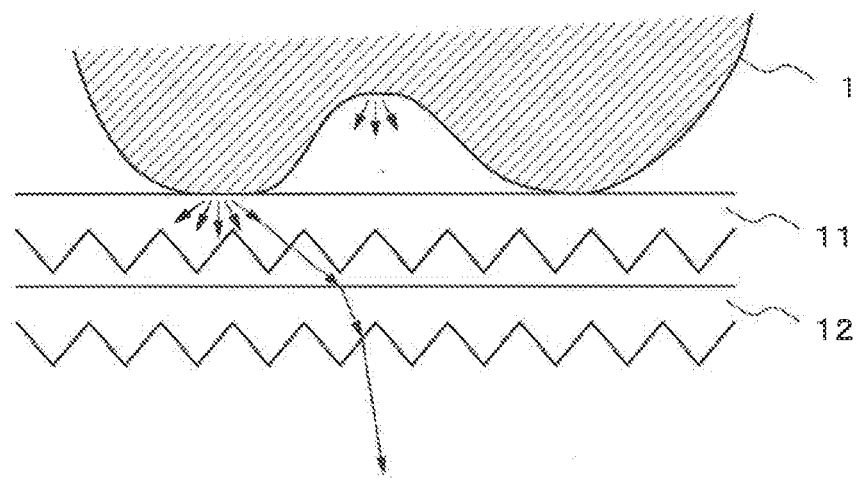
[FIG. 25]

1 Finger
2 Prism
3 Light source
4 Image sensor
5 Prism sheet
11, 12 Sheet
13 Two-ply sheet
14 Two-ply sheet with cuts
20, 21, 22 Imaging unit
30, 31 Holding unit
40 Reflecting unit
50 Control unit
60 Image correction unit
70 Feature extraction unit
80 Matching unit
90 Memory unit
100, 101, 102, 103 Skin pattern image collection device
141 Part around the left side
142 Part around the upper side
143 Part around the right side
200 Skin pattern matching device
221 Moving unit

The invention claimed is:

1. A skin pattern image collection device, comprising:
a contact unit in which two transparent sheets, each of which has an approximately flat surface and is formed with a plurality of grooves of the same shape arranged in a single direction on another surface, are overlapped so that the approximately flat surface of one of the transparent sheets and the surface on which the grooves are formed of the other transparent sheet face each other; and
an imaging unit which is disposed so as to receive light from the surface, on which the grooves are formed, of the contact unit, wherein
the contact unit refracts light, which is outputted from the transparent sheet that is farther from the imaging unit of the two transparent sheets of the contact unit, in a roughly normal direction by means of the transparent sheet that is closer to the imaging unit, and
the imaging unit collects a pattern of unevenness of skin which is in contact with the transparent sheet that is farther from the imaging unit by photographing the light.

2. The skin pattern image collection device according to claim 1, wherein
the two transparent sheets of the contact unit have flexibility, and
the contact unit bends in accordance with force that makes the skin touch the contact unit and with roundness of the skin and remains touching the skin, in case the skin touches the contact unit.

3. The skin pattern image collection device according to claim 2, comprising:
a holding unit which holds ends of the contact unit at a plurality of positions in a not-fixed and movable state.

4. The skin pattern image collection device according to claim 3, wherein
each part of the contact unit, which is adjacent to one of the positions at which the holding unit holds, bends independently, and
the contact unit is continuous at least at a midsection of the contact unit.

5. The skin pattern image collection device according to claim 2, comprising:
a reflection unit which reflects an image of a part, which does not face the imaging unit, of an uneven surface of the skin, toward the direction of the imaging unit.

6. The skin pattern image collection device according to claim 5, wherein
the imaging unit photographs the contact unit and an image, which is reflected by the reflection unit, of the contact unit simultaneously.

7. The skin pattern image collection device according to claim 2, wherein
a plurality of the imaging unit photograph different parts of the contact unit from directions each of which is a roughly normal direction of the part to be photographed.

8. The skin pattern image collection device according to claim 2, comprising:
a moving unit which moves the imaging unit in plural different places so that in each of the places the imaging unit photographs a part of the contact unit from a roughly normal direction of the part.

9. An skin pattern matching system, comprising: a skin pattern image collection device according to claim 1; and
a skin pattern matching device including:
a control unit which controls the skin pattern image collection device, and reading a skin pattern image collected by the skin pattern image collection device from the skin pattern image collection device;
an image correction unit which corrects the skin pattern image read by the control unit;
a feature extraction unit which extracts a feature for matching from the skin pattern image and generating feature data; and
a matching unit which performs matching of skin patterns based on feature data generated by the feature extraction unit.

10. A skin pattern collection method, comprising:
overlapping two transparent sheets, each of which has an approximately flat surface and is formed with a plurality of grooves of the same shape arranged in a single direction on another surface, so that the approximately flat surface of one of the transparent sheets and the surface on which the grooves are formed of the other transparent sheet face each other;
refracting light, which is outputted from the transparent sheet that is farther from a view point of the two transparent sheets, in a roughly normal direction by means of the transparent sheet that is closer to the view point, and collecting a pattern of unevenness of skin which is in contact with the transparent sheet that is farther from the viewpoint by the refracted light.

11. The skin pattern collection method according to claim 10, wherein the transparent sheets have flexibility, and the transparent sheets bend in accordance with force that makes the skin touch the transparent sheets and with roundness of the skin and remain touching the skin, in case the skin touches the sheets.

12. The skin pattern collection method according to claim 11, comprising:

holding ends of the transparent sheets at a plurality of positions in a not-fixed and movable state.

13. The skin pattern collection method according to claim 12, wherein each part of the transparent sheets, which is adjacent to one of the positions at which the transparent sheets are held, bends independently, and each of the transparent sheets is continuous at least at a midsection of the transparent sheets.

14. The skin pattern collection method according to claim 11, comprising:

reflecting an image of a part, which does not face the view point, of the transparent sheets in a roughly normal direction of the part, toward the view point.

15. The skin pattern collection method according to claim 14, comprising:

photographing the transparent sheets and a reflected image of the transparent sheets simultaneously.

16. The skin pattern collection method according to claim 11, comprising:

photographing different parts of the transparent sheets at a plurality of the view points from directions each of which is a roughly normal direction of the part to be photographed.

17. The skin pattern collection method according to claim 11, comprising:

moving an imaging unit in plural different places so that in each of the places the imaging unit photographs a part of the transparent sheets from a roughly normal direction of the part.

18. A matching method, comprising:

correcting a skin pattern image collected by the skin pattern collection method according to claim 10;

extracting a feature for matching from the skin pattern image and generating feature data; and performing matching of skin patterns based on the generated feature data.

19. A skin pattern image collection device, comprising:

a contact means for refracting light using two transparent sheets, each of which has an approximately flat surface and is formed with a plurality of grooves of the same shape arranged in a single direction on another surface, overlapped so that the approximately flat surface of one of the transparent sheets and the surface on which the grooves are formed of the other transparent sheet face each other; and an imaging means for collecting a pattern by being disposed so as to receive light from the surface, on which the grooves are formed, of the contact means, wherein the contact means refracts the light, which is outputted from the transparent sheet that is farther from the imaging means of the two transparent sheets of the contact means, in a roughly normal direction by means of the transparent sheet that is closer to the imaging means, and the pattern is a pattern of unevenness of skin which is in contact with the transparent sheet that is farther from the imaging means by photographing the light.

* * * * *